United States Patent
Vishwanath et al.

(10) Patent No.: US 7,245,930 B1
(45) Date of Patent: Jul. 17, 2007

(54) ACQUISITION MECHANISM FOR A MOBILE SATELLITE SYSTEM

(75) Inventors: T G Vishwanath, San Diego, CA (US); Michael Parr, Del Mar, CA (US); Zhen-Liang Shi, Germantown, MD (US); Simha Erlich, Haifa (IL)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 09/447,684

(22) Filed: Nov. 23, 1999

Related U.S. Application Data

(60) Provisional application No. 60/109,671, filed on Nov. 24, 1998.

(51) Int. Cl.
*H04B 7/00* (2006.01)

(52) U.S. Cl. .............. 455/502; 370/350; 370/503; 375/272; 375/354

(58) Field of Classification Search .......... 455/502, 455/427, 12.1, 13.2, 503; 370/503, 514, 370/520, 350, 316, 324, 342, 354; 375/145, 375/139, 149, 335, 343, 354, 364, 371, 373, 375/325, 324, 350, 356, 357, 362, 272; 342/395, 342/358, 420

See application file for complete search history.

(56) References Cited

U.S. PATENT DOCUMENTS

| | | | | |
|---|---|---|---|---|
| 5,732,076 A | * | 3/1998 | Ketseoglou et al. | 370/347 |
| 6,304,619 B1 | * | 10/2001 | Citta et al. | 375/139 |
| 6,356,555 B1 | * | 3/2002 | Rakib et al. | 370/441 |
| 6,405,147 B1 | * | 6/2002 | Fera | 702/108 |
| 6,418,158 B1 | * | 7/2002 | Vishwanath et al. | 370/350 |

FOREIGN PATENT DOCUMENTS

| WO | WO 94 29971 A | | 12/1994 |
|---|---|---|---|
| WO | WO 96/02990 | * | 2/1996 |
| WO | WO 96 19056 A | | 6/1996 |
| WO | WO 00 02325 A | | 1/2000 |

* cited by examiner

*Primary Examiner*—Joseph Feild
*Assistant Examiner*—S. Smith
(74) *Attorney, Agent, or Firm*—Craig Plastrik

(57) ABSTRACT

A method for enabling synchronization of a communications terminal in a wireless communication system, and a corresponding acquisition system of the communications terminal, wherein the method consists of the steps of: receiving a burst at a receiver of the communications terminal, the burst containing a composite waveform including two or more component waveforms, wherein each of the two or more waveforms has a known frequency variation throughout the burst; detecting the presence of the composite waveform; and estimating a frequency offset and a timing offset of the composite waveform as received into the receiver, whereby synchronization is achieved.

15 Claims, 7 Drawing Sheets

ACQUISITION MECHANISM FOR A MOBILE SATELLITE SYSTEM

This application claims priority under 35 U.S.C § 119(e) to U.S. Provisional Patent Application Ser. No. 60/109,671, filed Nov. 24, 1998, of Vishwanath et al., for ACQUISITION MECHANISM FOR A MOBILE SATELLITE SYSTEM, which U.S. Provisional Patent Application is incorporated herein by reference.

This application is related to U.S. Patent Application Ser. No. 09/447,685, filed concurrently herewith Nov. 23, 1999, of Vishwanath et al., for WAVEFORM SUPPORTING SYNCHRONIZATION IN MOBILE SATELLITE SYSTEMS; now U.S. Pat. No. 6,418,158, which is incorporated herein by reference.

BACKGROUND OF THE INVENTION

The present invention relates to signal synchronization, and more particularly to signal synchronization in a communications system. Even more particularly, the present invention relates to synchronization of wireless transceivers by transmitting a composite waveform having a known frequency variation to an unsynchronized wireless transceiver of a mobile satellite communications system for signal synchronization and a corresponding method of acquiring the composite waveform at the unsynchronized transceiver.

In mobile communications systems, such as a mobile satellite communications system, mobile communications terminals (i.e. mobile terminals or transceivers) are frequently placed in positions in which they cannot maintain synchronization with a satellite. For example, the mobile terminal might be turned off and stored, may be carried into a building with significant signal attenuation, or may be newly purchased. In any case, the mobile terminal must be able to find the signals sent from a satellite for synchronization prior to being able to begin communication. As is typically the case, a terrestrial gateway station or base station is constantly transmitting bursts containing waveforms used for synchronization over a specified channel, such as a frequency control channel (hereinafter referred to as FCCH). The mobile terminal must find the signal waveform that is transmitted from the gateway station via the satellite in order to be able to begin communication with the gateway station via the satellite. This process is commonly referred to as acquisition.

The gateway station will transmit a synchronization waveform (also referred to as a waveform or signal waveform) as a limited duration burst, e.g. 5 msec, periodically, e.g. once every 320 msec. In acquiring the synchronization signal, a mobile terminal will typically have to search within about one thousand communications channels (i.e. channels) of a communications link to find the waveform over the period of 320 msec for the 5 msec waveform. Often, to save processing during acquisition at the mobile terminal, the mobile terminal will look at approximately ten preassigned channels of the one thousand channels for the transmitted waveform. The mobile terminal must search in different channels because the burst containing the waveform does not usually arrive at the same frequency that the waveform is transmitted at due to frequency shifts/offsets from the gateway station to the satellite and from the satellite to the mobile terminal. Furthermore, the mobile terminal does not know at what time within any given 320 msec window the 5 msec waveform will arrive.

In the prior art, such waveforms are detectable at the mobile terminals. A requirement of such waveforms is that a signal frequency (or carrier frequency) of the waveform be known. However, because of signal degradation and distortions due to all forms of time delays, propagation delays, doppler shifting, and noise, it is necessary to compensate for the frequency and/or time shifting of the waveform.

By way of background, time delays result from several factors. Time delays may be caused by obstructions in a dominant signal path that generate "multi-paths" to occur from scattered paths resulting from reflections off the obstructions. The differences in distance between the multi-paths result in timing offsets as well as fading of the signal, depending upon the type of channel (e.g. Rician or Rayleigh fading). Also, in mobile satellite communications systems, in particular, relative motion between the satellite and the mobile terminal due to a velocity of the satellite as it orbits the Earth and another velocity of the terminal as it is operated from a moving vehicle, for example, results in varying time delay by the signals traveling between the satellite and the mobile terminal. Even a stationary mobile terminal may experience relative motion between itself and the satellite due to motion of the satellite in orbit. For example, in a geostationary satellite system, the satellite follows an approximately sinusoidal pattern of north-south movement in orbit. As such, if the satellite and the mobile terminal are moving towards each other, a transmitted signal from the satellite will arrive earlier and earlier as the relative movement continues.

Doppler shifting is also the result of such relative movement of the satellite and the mobile terminal. As the mobile terminal and the satellite move toward one another, frequencies appear to get higher, but as the mobile terminal and the satellite move away from one another, frequencies appear to get lower.

This gives rise to a need for a new type of signal waveform used for synchronization that can easily be detected and be resolved for doppler shifting (i.e. frequency offsets) and time delays.

Furthermore, in the prior art, different types of signal waveforms are transmitted from the gateway station to a mobile terminals via satellites for synchronization. This is because in satellite communications systems, many different services are provided that operate at disparate bandwidths and tolerate disparate levels of signal attenuation and minimum signal-to-noise ratios (SNRs). Consequently, current mobile satellite systems require more than one type of waveform to be used for the many different services.

As an example, one key service provided by the mobile satellite systems is voice or data communication. Effective voice communication requires that channel attenuations be less than an order of 10 dB whereas other services, such as alerting, may only require that channel attenuations be less than an order of 30 dB. By way of example, if a tree were blocking the line-of-sight path of a voice signal between a satellite and the terminal, and attenuated a voice signal from the satellite by less than 10 dB, the voice signal could still be received by the mobile terminal. However, if a building were blocking the line-of-sight path of the voice signal and attenuated the voice signal by 20 dB, then the mobile terminal could not receive the voice signal but could still track and receive an alerting signal from the satellite.

In contrast, in "alerting", the mobile satellite system typically tolerates very low signal conditions as compared with conditions that can be tolerated by a typical voice signal. Specifically, there is typically a 20 dB difference in channel attenuation levels between conditions in which an alert signal can be successfully received and conditions in which a voice signal can be successfully received. Thus, conditions supporting alert signals will not necessarily support voice signals in the same mobile satellite system.

Thus, in order to accommodate the use of such varying signal level tolerances (e.g. voice services and alerting services) the prior art utilizes distinct waveforms for each distinct service, e.g., one waveform for tracking alerting, and another waveform for synchronizing voice communications.

Thus, there is a need in the wireless communication industry to provide a waveform that supports a variety of services under different signal conditions to conserve power and resources in the mobile satellite system.

One example of a prior art waveform which is easily detectable and resolvable for frequency shifting, but not timing offsets, and which has been used in prior art communications systems is a sinusoidal waveform, or a "tone", which has a constant frequency over time. An example of such a tone is a sine wave or cosine wave with any random phase $\phi$.

Although sinusoidal waveforms or tones are easily detectable by mobile terminals, they present a problem of "spurs" in the received frequency when the tone travels in mobile terminal's hardware. The receiver hardware of the mobile terminal typically sees a received waveform (i.e. tone) as a very low level signal. Furthermore, a receiver typically includes a variety of frequency sources that tend to induce sinusoids to the received signal (i.e. tone), making distinctions between the received signal and the induced sinusoids difficult to discern.

These induced sinusoids are called "spurs" which are essentially frequency-domain spikes. When spurs occur in the receiver, there can be a loss of synchronization because the waveform of interest (i.e. the tone) may be lost. One way to avoid these spurs is to change RF hardware so that they are eliminated by the hardware, however this is costly and takes space and power within the hardware itself.

Thus, another desirable design constraint of the waveform (which may be referred to as a synchronization signal) is that it not require a complex receiver or complicated changes to standard receiver hardware and that the waveform not induce hardware related degradation thereof. In particular, the waveform must be robust against induced spurs.

Other prior art methods have eliminated the problem of "spurs" by implicitly spreading the spurs by using a signal waveform such as a Quadrature Phase Shift Keyed (QPSK) signal. Such a QPSK signal is modulated according to phase and therefore is not correlated to the spurs. Although the QPSK modulated signal solves the problem of spurs, it does not solve the detectability of varying signal levels used in multiple levels of services, such as voice and alerting services.

Other prior art methods have used, as the waveform used for synchronization, a tone followed by a modulated waveform, wherein the tone is used to compute frequency and the modulated waveform is used to compute timing. Although the use of the tone followed by the modulated waveform solves the problem caused by induced spurs, it exhausts system resources such as power, bandwidth and time, and is not well-suited to two or more levels of service, such as alerting and voice communication.

With regard to the acquisition of the waveform at a mobile terminal, and considering several of the above stated concerns it is desirable to transmit a waveform that is easily detectable, can resolve both frequency and timing offsets, avoids the problem of "spurs" in the receiver, and can support different types of services, e.g. acquisition of voice services and tracking of alerting. Thus, such a waveform should be practical to implement on a digital signal processor, for example, using a Fast Fourier Transform (FFT), should not resemble a tone, and should not require hardware modifications in the receiver.

The present invention advantageously addresses the above and other needs.

SUMMARY OF THE INVENTION

The present invention advantageously addresses the needs above as well as other needs by providing a method and apparatus for the acquisition of received waveforms that are used for the synchronization of wireless communications terminals, and the estimation of the frequency offset and timing offset of the received waveforms.

In one embodiment, the present invention can be characterized as a method for enabling synchronization of a communications terminal in a wireless communication system comprising the step of receiving a burst at a receiver of the communications terminal, the burst containing a composite waveform including two or more component waveforms, wherein each of the two or more waveforms has a known frequency variation throughout the burst. The composite waveform has a composite bandwidth on an order of an available channel bandwidth, and wherein each of said two or more component waveforms has a component bandwidth on the order of the available channel bandwidth. Additionally, a range of values for the differences between the instantaneous frequencies of two of said two or more component waveforms is on an order of twice of said available channel bandwidth.

In another embodiment, the present invention may be characterized as an acquisition system of a wireless communications terminal for acquiring a received composite waveform including two or more component waveforms and estimating a frequency offset and a timing offset of the received composite waveform. The acquisition system includes a first phase shifter for desweeping a first component waveform of the received composite waveform and a first processor coupled to the first phase shifter for transforming the first component waveform having been deswept into a first frequency domain representation. Furthermore, the acquisition system includes a second phase shifter for desweeping a second component waveform of said received composite waveform and a second processor coupled to the second phase shifter for transforming the second component waveform, having been deswept, into a second frequency domain representation. Furthermore, a detection processor is coupled to said first processor for detecting a peak of said first frequency domain representation, thus, detecting the presence of said first component waveform. The detection processor includes a parameter estimator for computing said frequency offset and said timing offset of said received composite waveform, having been detected.

In a further embodiment, the present invention may be characterized as a method for enabling synchronization of a communications terminal in a wireless communication system comprising the steps of: receiving a burst at a receiver of the communications terminal, the burst containing a composite waveform including two or more component waveforms, wherein each of the two or more waveforms has a known frequency variation throughout the burst; detecting the presence of the composite waveform; and estimating a frequency offset and a timing offset of the composite waveform as received into said receiver, whereby synchronization is achieved.

In a preferred embodiment, the composite waveform may be a dual-chirp waveform including an up-chirp component waveform and a down-chirp component waveform.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
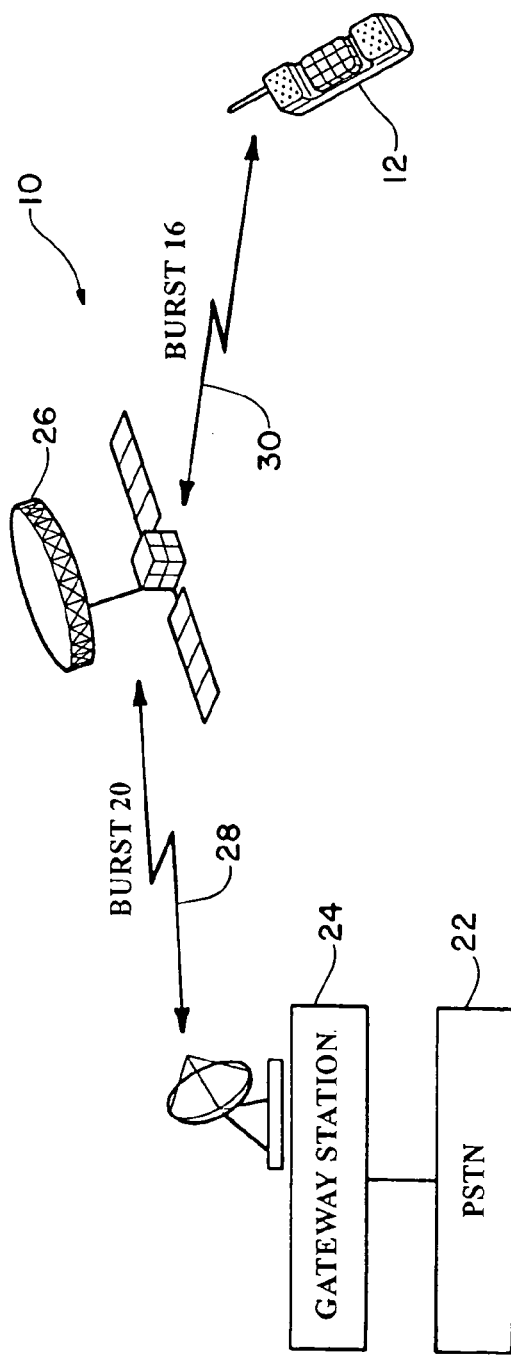
FIG. 1 is a block diagram of a satellite communications system in which the present invention may be employed in accordance herewith.

Referring first to FIG. 1, a block diagram of a typical satellite communications system is shown. The satellite communications system 10 includes a first communications terminal or a gateway station 24 (also referred to as a base station), second communications terminal or mobile terminal 12 (also referred to as a wireless terminal or wireless transceiver), a public switched telephone network (PSTN) 22, a satellite 26, and communications links 28 and 30. The satellite communications system 10 is one embodiment in which the present invention may be practiced. It is noted that the terms communications terminal, terminal, and transceiver are used synonymously.

The public switched telephone network (PSTN) 22 is coupled to the gateway station 24 in a conventional manner, using, for example conventional wire-based, land-based or land-line connections. The gateway station 24 is coupled to the satellite 26 through a first communications link 28, and the satellite 26 is coupled to the mobile terminals through communications link 30.

In practice, voice communications take place between the mobile terminal 12 and the PSTN 22 via the gateway station 24 and the satellite 26. As such, the PSTN 22 switches the voice communications to the gateway station 24 to be transmitted to the mobile terminal 12 via the satellite 26, as is conventionally done. As earlier described, the mobile terminal 12 is frequently placed in positions in which it cannot maintain synchronization with a satellite 26. For example, the mobile terminal 12 might be turned off and stored, may be carried into a building with significant signal attenuation, or may be newly purchased. In any case, the mobile terminal 12 must be able to find the waveform (also referred to as a synchronization signal) sent from the gateway station 24 via the satellite 26 to synchronize with the timing and frequency of the communications link 30 prior to being able to begin communication. Thus, as is known in the art and shown in FIG. 1, the gateway station 24 transmits the waveforms to all mobile terminals 12 within coverage of the satellite 26. The waveforms in a conventional satellite communications system 10 are transmitted in short duration continuous wave bursts ("bursts") 20 between the gateway station 24 and the satellite 26, and in burst 16 between the satellite 26 and the mobile terminal 12 in a variety of conventional schemes. The satellite 26 relays the burst 20 to mobile terminal 12 for synchronization by an acquisition system in the mobile terminal 12.

Figure 2:
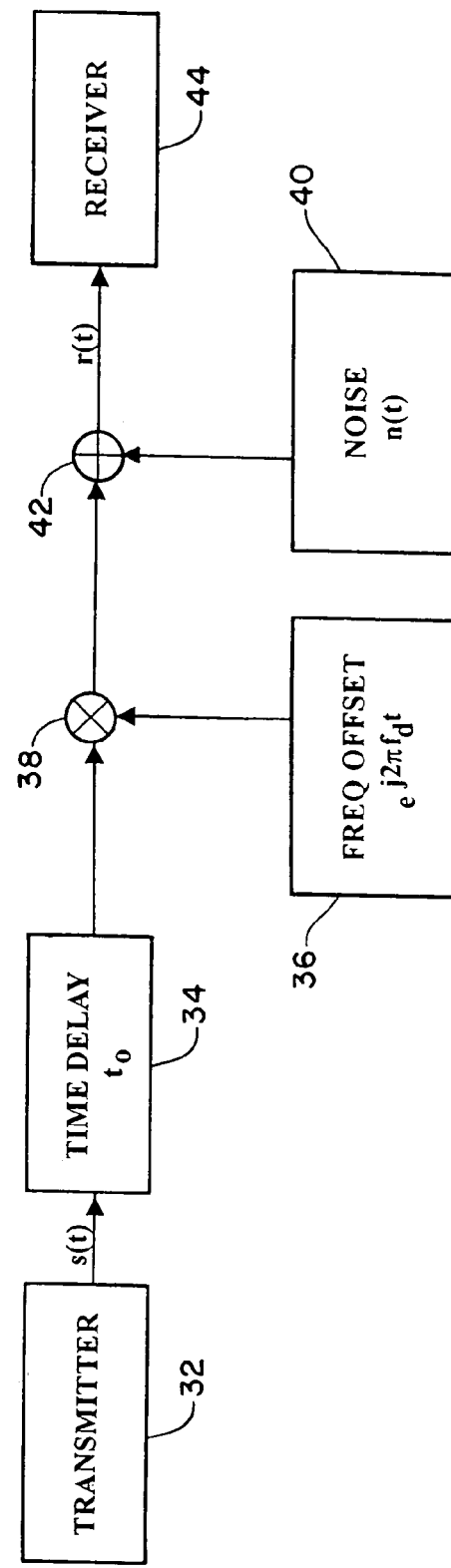
FIG. 2 is a block diagram illustrating contributions to a waveform as the waveform is transmitted from a source transmitter, e.g. a gateway station, during propagation along a line-of-sight path to a receiver, e.g. via a satellite.

As the bursts 16 and 20 propagate through air and other intercepting media along a direct line-of-sight or other multi-paths resulting from scattering due to reflection and diffraction of signals contained within the bursts 16 and 20 the signals become distorted and attenuated due to many different factors as described further with reference to FIG. 2.

In accordance with one embodiment of the present invention, a waveform that addresses the concerns of the prior art, known as the composite waveform (also referred to as the composite signal waveform), is transmitted from the gateway station 24 to mobile terminals 12. One example of a composite signal waveform is a dual-chirp waveform described below. The composite waveform, e.g. the dual-chirp waveform is discussed in detail with reference to FIGS. 3 through 6D. Furthermore, in accordance with another embodiment of the present invention, a novel acquisition section is present in the mobile terminal 12 that is used to acquire the composite waveform and extract both timing and frequency offsets of the received composite waveform. The acquisition section is discussed in more detail with reference to FIGS. 7 through 10.

Referring next to FIG. 2, a functional block diagram is shown of how contributions to a signal waveform (or waveform) are added as an initial signal s(t) (or "source signal" or "transmitted signal") is propagated from a source transmitter 32 (e.g. the transmitter of the gateway station 24 of FIG. 1) to a receiver 44 (e.g. the receiver of the mobile terminal 12 of FIG. 1). The initial signal, or source signal, s(t) is sent by the source transmitter 32 and incurs time delay 34 due to a time delay "$t_0$" during propagation of the signal from the source transmitter 32 to the receiver 44.

As previously described in the background herein, time delays result from several factors. Time delays may be caused by obstructions in the signal path that generate "multi-paths" from scattering due to reflections and diffractions of the signal from the obstructions. The differences in distance between the multi-paths result in time delay offsets as well as fading of the signal, depending upon the channel (e.g. Rician or Rayleigh fading).

Also, in a satellite communications system, such as shown in FIG. 1, relative motion may exist between the satellite (i.e. source transmitter 32) and the mobile terminal 12 (i.e. receiver 44) due to the relative velocity of the satellite as it orbits the Earth and another velocity of the mobile terminal as it operates from a moving vehicle, for example, results in varying time delays by the signals traveling there between. These timing delays all contribute to the time delay of $t_0$ as represented by time delay 34.

An additional source of signal attenuation is a frequency offset as represented as frequency offset 36. Frequency offsets of the carrier frequency of the source signal s(t) in satellite communications systems are primarily due to Doppler occurring from relative motion of the source transmitter 32 and the receiver 44. As the source transmitter 32 and the receiver 44 move toward one another, the received carrier frequency appears to shift higher; as they move away from one another, the received carrier frequencies appear to shift lower. Thus, a frequency offset 36 is introduced into the source signal s(t). The frequency offset 36 is represented mathematically by multiplying, at multiplier 38, the source signal s(t) with a complex waveform such as represented by $\exp(j2\pi f_d t)$, wherein $f_d$ is the doppler frequency offset in Hertz and t is time in seconds.

Thus, as in known in the art, these contributions of time delay 34 and frequency offset to the source signal s(t) require that an acquisition system of a mobile terminal 12 resolve these contributions before being able to properly acquire the source signal and thus, synchronize with a transmitter 32.

Additionally, noise contributions n(t) 40, such as Additive White Guassian Noise (AWGN), are represented in hardware terms by mathematically adding a low-level waveform n(t) exhibiting Guassian characteristics, by the adder 42. The source signal s(t) shown, therefore, represents a signal which is a true signal (i.e. undistorted by the channel through which the signal is transmitted) transmitted by the source transmitter 32, represented in continuous time t wherein t=0 at a start of the burst. Thus, as can be seen in FIG. 2, at the receiver 44, a received signal r(t) may be represented as $r(t)=s(t-t_0)e^{(j(2\pi f_d t)+\phi)}+n(t)$, wherein $t_0$ is the time delay in seconds, $f_d$ is the Doppler frequency offset in Hertz and $\phi$ is a random phase offset. Thus, r(t) equates to a phase shifted version of s(t), including random phase.

In accordance with the invention herewith, a waveform used for synchronization must be transmitted from the gateway station 24 (source transmitter 32) to the mobile terminal 12 (receiver 44), wherein the mobile terminal can easily detect the waveform and resolve the frequency offset and timing offset in the presence of noise.

The Composite Waveform

Figure 3:
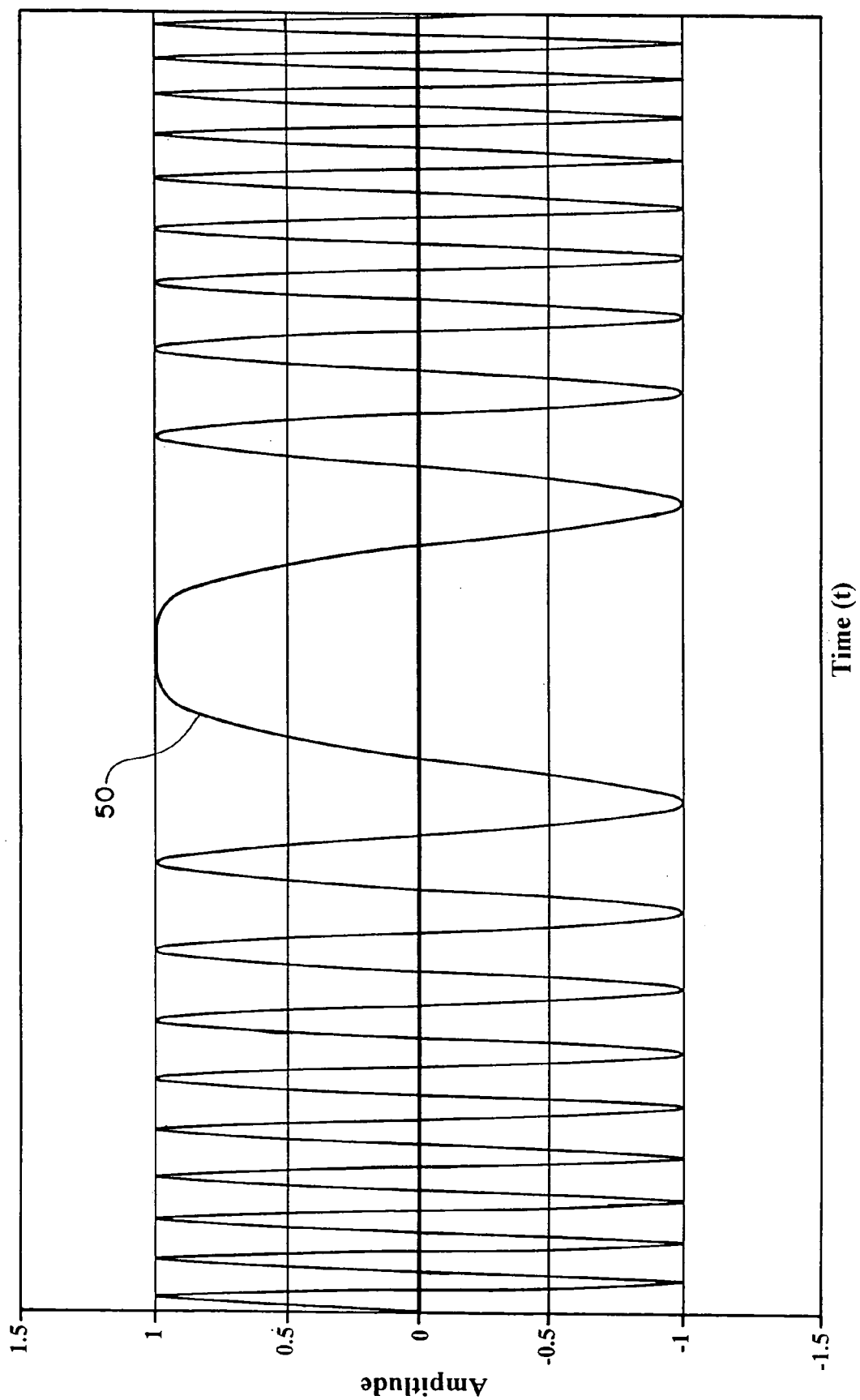
FIG. 3 is a plot of amplitude versus time for the composite waveform (also referred to as a composite signal waveform) in accordance with one embodiment of the present invention, shown as a dual-chirp waveform that includes an up-chirp waveform and a down-chirp waveform, which may be transmitted by the gateway station 24 to the mobile terminal 12 of the satellite communication system of FIG. 1 prior to experiencing frequency and timing offsets during transmission through the communications links.

Referring next to FIG. 3, a plot of amplitude versus time for a composite waveform is shown in accordance with one embodiment of the present invention, which is shown as a dual-chirp waveform that includes a combined up-chirp waveform and a down-chirp waveform, which may be transmitted by the gateway station 24 to the mobile terminal 12 via the satellite 26 of the satellite communication system 10 of FIG. 1. The composite waveform (also referred to as a composite signal waveform) is shown at transmission and thus, prior to experiencing frequency offsets, timing offsets, and noise during transmission through the communications link. The dual chirp waveform 50, which is one example of a composite waveform consistent with this embodiment of the present invention, provides a waveform for synchronization, that addresses the needs of the prior art as described above.

This example of a composite waveform is referred to as a dual-chirp waveform 50 because it is a composite waveform consisting of two component waveforms: an up-chirp waveform and a down-chirp waveform. A chirp waveform, as known in the art, is a signal in which the frequency changes linearly over the duration of the waveform. In other words, the frequency is "swept" (i.e. the frequency varies with time) across the duration of the chirp waveform. This is in contrast to a sinusoidal or "tone" waveform in which the frequency remains constant throughout the duration of the waveform making it susceptible to "spurs" in the receiver of the mobile terminal as described above.

The dual-chirp waveform 50 is a composite of an up-chirp waveform and a down-chirp waveform. In operation, the up-chirp waveform has a frequency that increases linearly with time, while the down-chirp waveform has a frequency that decreases linearly with time (see FIG. 4 which illustrates a frequency versus time plot for the dual-chirp waveform 50). Advantageously, the frequency of the up-chirp waveform and the down-chirp waveform vary oppositely with respect to time.

The up-chirp waveform begins with an initial frequency (e.g. having a frequency offset relative to a carrier frequency) of a first predetermined frequency offset (e.g. $f_c$ −7500 Hz). During each burst, the initial frequency of the up-chirp waveform increases linearly to reach an ending frequency offset value of the initial frequency (e.g. $f_c$ +7500 Hz) by an end of the burst. Similarly, the down-chirp waveform begins at an initial frequency that is the ending frequency of the up-chirp waveform (e.g. $f_c$ +7500 Hz) which decreases linearly until it reaches it's ending frequency (e.g. $f_c$ −7500 Hz), which is the initial frequency of the up-chirp waveform. This frequency relationship is more easily seen in the frequency versus time plot shown in FIG. 4.

Separately, both the up-chirp waveform and the down-chirp waveform are represented mathematically on a complex plane, and may be referred to as "complex waveforms". Thus, both the up-chirp waveform and the down-chirp waveform may be represented mathematically as having a real component and an imaginary component. Advantageously, the upchirp waveform and the downchirp waveform are transmitted simultaneously and are "in sync" with each other, i.e. the down-chirp waveform starts at a frequency at which the up-chirp waveform ends, that is, e.g. +7500 Hz, and ends at e.g. −7500 Hz. Thus, the down-chirp waveform is the complex conjugate of the up-chirp waveform. As such, in the dual-chirp waveform, the imaginary components of the up-chirp waveform and the down-chirp waveform cancel out, the dual chirp waveform 50 is represented completely by a real component. Therefore, the dual-chirp waveform 50, is represented mathematically on a real plane, and may thus be referred to as a "real waveform", as shown in FIG. 3 as a composite of an up-chirp waveform and a down-chirp waveform.

For various reasons, which will be discussed more with reference to FIG. 4 and throughout the specification, the dual-chirp waveform is one example of a composite waveform of two simultaneously transmitted waveforms having a known frequency variation, i.e. the frequency varies linearly with time. The dual-chirp waveform 50 has preferred properties, making it a preferred choice as a waveform for synchronization for several reasons. Since both frequency variations of the up-chirp waveform and the down-chirp waveform are known and are opposite of each other, both a frequency offset $f_d$ and a time delay $t_o$ of the received signal r(t) can be estimated by solving for two (2) equations with two unknowns in an acquisition section of a mobile terminal as is described in more detail with reference to FIG. 7.

Figure 4:
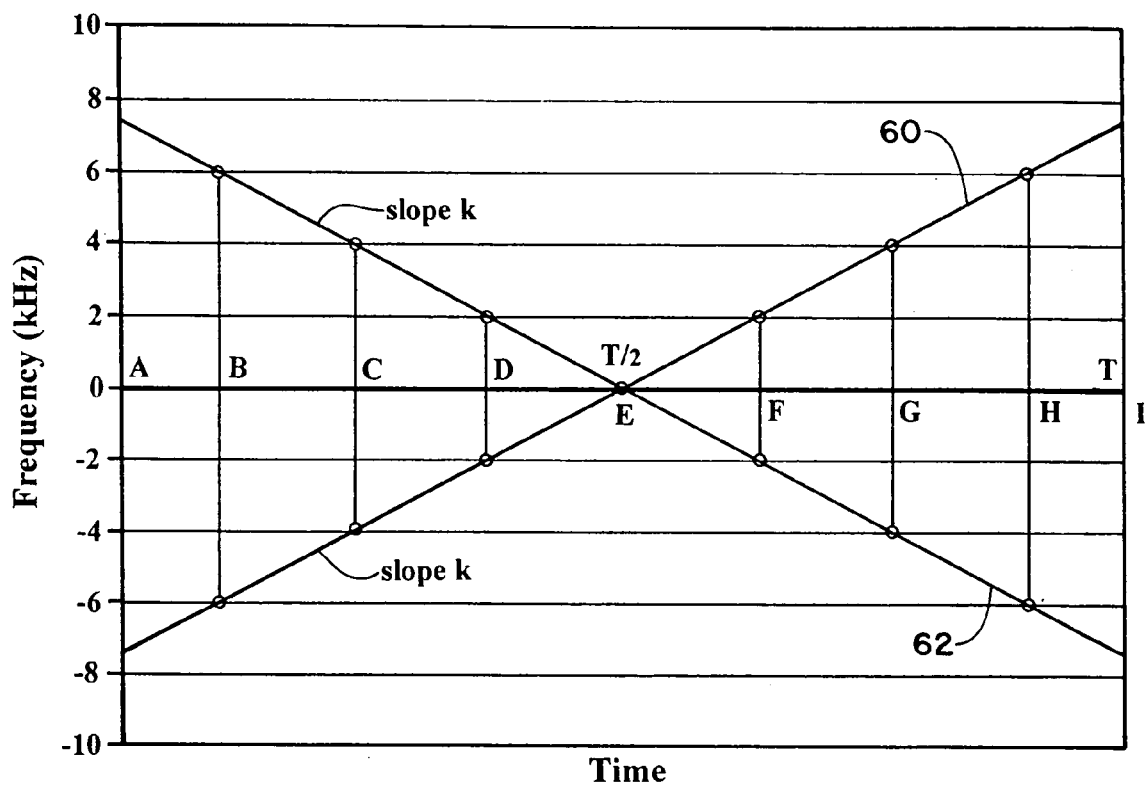
FIG. 4 illustrates a plot of frequency versus time for the transmitted composite waveform, shown as the dual-chirp waveform including the up-chirp waveform and down-chirp waveform of the embodiment shown in FIG. 3, as would be transmitted in the satellite communication system of FIG. 1.

Referring next to FIG. 4, a frequency versus time plot is shown of the dual-chirp waveform 50 of FIG. 3, which illustrates the two component waveforms, i.e. the up-chirp waveform 60, wherein frequency increases linearly with time, and a simultaneously transmitted down-chirp waveform 62, wherein frequency decreases linearly with time. FIG. 4 illustrates the linearly increasing or decreasing frequency with time of each respective waveform.

The up-chirp waveform 60 and the down-chirp waveform 62 of the composite dual-chirp waveform 50 can be expressed mathematically. In terms of the signals shown in FIG. 2, the source signal s(t) that is transmitted, as a burst containing the dual-chirp waveform of FIG. 3, from the gateway station 24 to the mobile terminal 12, with respect to continuous time t, wherein t is defined with respect to a start of a burst of duration T, (i.e. t=0 at the start of the burst), then the transmitted signal s(t) is defined by equation (1):

$$s(t) = s_1(t) + s_2(t) \tag{1}$$

$$p(t)[e^{j\pi K(t-T/2)^2} + e^{-j\pi K(t-T/2)^2}] \tag{2}$$

wherein $s_1(t)$ represents an up-chirp waveform of frequency $f_1(t)$ and $s_2(t)$ represents a down-chirp waveform of frequency $f_2(t)$, T is the duration of the dual-chirp waveform in seconds, p(t) is a window defining an envelope of the signal in time (also referred to as a ramping function such that within the window of time p(t)=1 and at times outside of the window of time p(t)=0), and wherein $$f_1(t) = K(t-T/2), \text{ and} \tag{3}$$

$$f_2(t) = -K(t-T/2) \tag{4}$$

where K is sweeping rate parameter (i.e. the rate at which the frequency is "swept" across the duration of the burst or the "slope" of the lines presenting the up-chirp waveform and the down-chirp waveform) or frequency rate-of-change of $f_1(t)$ and $f_2(t)$ respectively. As shown in FIG. 4, K is the slope of the up-chirp waveform 60 and −K is the slope of the down-chirp waveform 62. In alternative composite waveforms, K does not have to be the same for each component waveform.

There are several reasons why a composite waveform, such as the dual-chirp waveform 50 as shown in FIGS. 3 and 4 overcomes the concerns of prior art waveforms used for synchronization. First, advantageously, the transmitted dual-chirp waveform easily lends itself to detection at a mobile terminal, for example, using a Fast Fourier Transform (FFT). This process is further described with reference to FIGS. 7–10. In practice, an FFT enables acquisition to be performed in real-time with firmware/hardware, as is done in some types of prior art waveforms, such as a waveform that consists of a tone followed by a modulated waveform as described above. Thus, the ability to detect the dual-chirp waveform 50 using an FFT is a desirable feature and one driver for the present invention.

Furthermore, by looking at a received dual-chirp waveform 50 contained in the received signal r(t) of FIG. 2, acquisition systems at the receiver 44 of FIG. 2 (e.g. mobile terminal 12) employing an FFT can identify the dominant frequency components of both the deswept up-chirp waveform 60 and down-chirp waveform 62, which is then used to estimate the frequency offset $f_d$ (i.e. the Doppler frequency offset) and the time offset $t_0$ (i.e. timing delay), in the received dual-chirp waveform. This is enabled since the up-chirp waveform 60 and the down-chirp waveform 62 each will be received with an unknown frequency offset $f_d$ and an unknown timing offset $t_0$. Furthermore, each component waveform can be expressed mathematically as a relationship including the frequency offset, timing offset, and the frequency estimated by the FFT. Thus, the two component waveforms of the dual-chirp waveform will provide two equations and two unknowns ($f_d$, $t_0$) if the peak frequency estimates (obtained with an FFT) of both the up-chirp waveform 60 and the down-chirp waveform 62 are determined by a search algorithm. Thus, $f_d$ and $t_0$ can be solved. This method enables a reduction in the amount of synchronization information needed as compared with the use of pure sinusoids or tones in the FCCH. The FFT and the frequency offset and timing offset estimations are further described below with reference to FIGS. 7–10.

Additionally, the dual-chirp waveform 50 does not resemble a "tone" or a sinusoid having a constant frequency; thus, the problem of "spurs" introduced into the signal waveform at the receiver (e.g. mobile terminal 12) are overcome.

Also, the dual-chirp waveform illustrated in FIGS. 3 and 4 can support an "alerting" operation when a satellite communications system such as shown in FIG. 1 needs a robust mechanism to provide synchronization with acceptable degradation. The sweep parameter or slope K of the up-chirp waveform 60 and down-chirp waveforms 62 controls a trade-off between timing accuracy and signal bandwidth. Higher values of K increase the accuracy of the timing estimate; however, the value of K is limited by the available bandwidth of the channel. However, in reality there is a frequency uncertainty involved, due to the local oscillator in the mobile terminal 12, so realistically the value of K is even further limited to less than the available bandwidth of the channel.

Additionally, the dual-chirp waveform 50 of FIGS. 3 and 4 also supports signal-to-noise (SNR) estimation and provides significantly better SNR results than estimates using data modulated waveforms at low SNR's. This advantage results from the receiver's knowledge of the expected waveform, unlike unknown data modulated waveforms, since the mobile terminal is configured to know what the composite waveform, e.g. dual-chirp waveform 50, should look like.

This better SNR estimation provides more accurate channel state determination, in turn. Assuming dual-chirp waveforms of duration equal to 112 data bearing symbols, the dual-chirp waveform 50 can support normal data and control traffic operating at typical values of +6 dB $E_s/N_0$ (i.e. SNR), alerting operations at −8 dB $E_s/N_0$, tracking at around −15 dB $E_s/N_0$, and $E_s/N_0$ estimation at around −20 dB $E_s/N_0$. This is a significant improvement in versatility since the dual-chirp waveform advantageously supports both voice and data communications and supports other services, such as alerting, by using the same signal waveform. As earlier stated, prior art systems must send separate waveforms to support voice/data communications and alerting.

It is important to note that the dual-chirp waveform 50 shown specifically in FIGS. 3 and 4 is only one example of a composite waveform that can be used as a synchronization signal sent from the gateway station to a mobile terminal of a satellite communications system, for example. Other types of composite waveforms could also be used. There are three main design parameters, which will be described, that would define such composite waveforms, such as the dual-chirp waveform, for example.

The first design characteristic for the composite waveform is that the composite waveform should be a composite of two or more component waveforms that each have frequency that varies with time (i.e. $f_1(t)$, $f_2(t)$, ... $f_n(t)$, where n is the number of waveforms) that are simultaneously transmitted from the gateway station. Although, more than two waveforms may be used, two waveforms is the most efficient in terms of processing at the acquisition system of the mobile terminal. Furthermore, the frequencies of the two or more component waveforms do not have to vary linearly with time (as the dual-chip waveform does) or vary at the same rate, e.g. the slope or K is different for the different component waveforms.

The second design characteristic of the composite waveform is that the range of values of the frequencies of the component waveforms should be as large as possible. Thus, the bandwidth of $f_1(t)$ and the bandwidth of $f_2(t)$ should be as large as possible while considering the available bandwidth of the channel. For example, if the available bandwidth of the 23.4 kHz channel is 18 kHz (allowing for both the channel bandwidth and the carrier uncertainty in the receiver, e.g. local oscillator, of the mobile terminal), the bandwidth of the component waveforms should be greater than half (50%), or ideally greater than 80%, of the available bandwidth of the channel (e.g. 15 kHz is greater than 9 kHz), but would still work at as low as 10% of the available bandwidth of the channel (e.g. greater than 1.8 kHz). Shown in FIG. 4, the range of values of $f_1(t)$, which is the up-chirp waveform 60, is from $f_c$−7500 Hz to $f_c$+7500 Hz (total bandwidth 15 kHz of an available bandwidth of 18 kHz) and the range of values of $f_2(t)$, which is the down-chirp waveform 62, is from $f_c$+7500 Hz to $f_c$−7500 Hz (total bandwidth 15 kHz of an available bandwidth of 18 kHz). The lower the bandwidth of the component waveforms is, the more the component waveforms resemble "tones" to which unmodulated spurs at the receiver become an issue.

And the third design characteristic for the composite waveform is that the range of values for the differences between the instantaneous frequencies of the component waveforms should be as great as possible. This concept relates to FIG. 4 in that the slope of up-chirp waveform 60 (i.e. $K_1$ in Eq. (3)) and the slope of the down-chirp waveform 62 (i.e. $K_2$ in Eq. (4)) should be as different as possible. As an example, as shown in FIG. 4, at point "A", the difference between $f_1(t)$ and $f_2(t)$ is about −15 kHz. At point "B", the difference between $f_1(t)$ and $f_2(t)$ is about −12 kHz. At point "C", the difference between $f_1(t)$ and $f_2(t)$ is about −8 kHz. And at point "D", the difference between $f_1(t)$ and $f_2(t)$ is about −4 kHz. At point "E", the difference between $f_1(t)$ and $f_2(t)$ is about 0 kHz. At point "F", the difference between $f_1(t)$ and $f_2(t)$ is about +4 kHz. At point "G", the difference between $f_1(t)$ and $f_2(t)$ is about +8 kHz. At point "H", the difference between $f_1(t)$ and $f_2(t)$ is about +12 kHz. And at point "C", the difference between $f_1(t)$ and $f_2(t)$ is about +15 kHz. Thus, the range of values for the difference between the instantaneous frequencies of the up-chirp waveform 60 and the down-chirp waveform 62 varies between −15 and +15 kHz, for a total range of 30 kHz. Note that even though the magnitude of the slope of the two component waveforms is the same, they are opposite in direction.

Figure 4A:
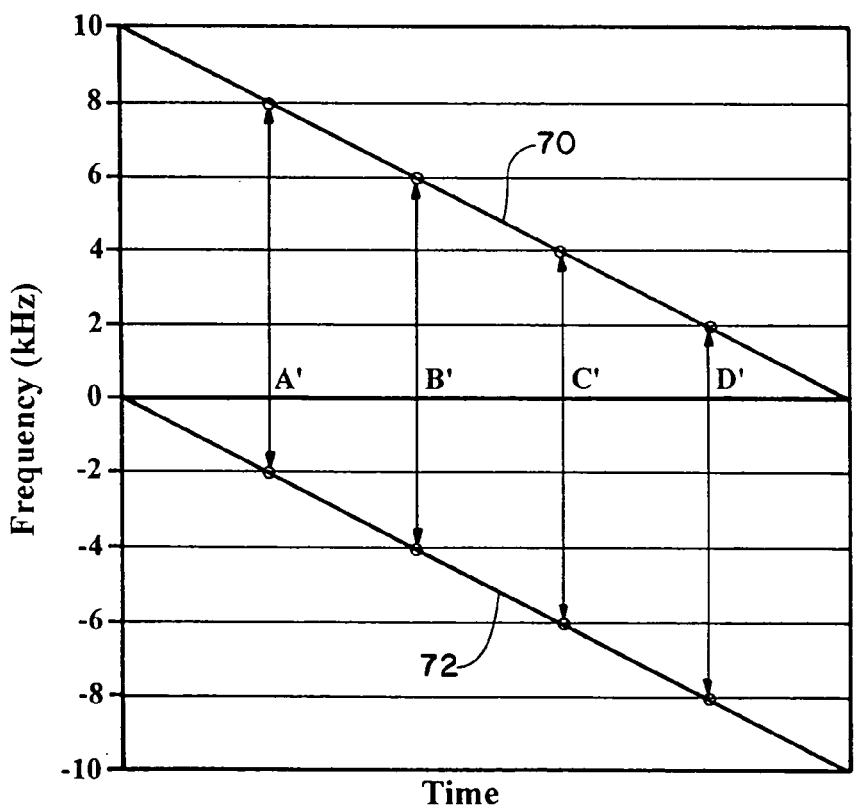
FIG. 4A illustrates a plot of frequency versus time for a transmitted composite waveform not in accordance with the present invention, which is shown as a comparison to the composite waveform of FIG. 4 and to distinguish the composite waveform of the present invention with other types of composite waveforms.

In contrast, a composite waveform that would violate the third design characteristic would be the composite waveform shown in FIG. 4A that includes two down-chirp waveforms, first down-chirp waveform 70 and second down-chirp waveform 72 (referring briefly to FIG. 4A). Note that at points "A'", B'", C'", and D'", the difference between the instantaneous frequencies of the first down-chirp waveform 70 and the second down-chirp waveform 72 is about 10 kHz at each point. Thus, the range of values for the differences is essentially zero (i.e. the differences vary between −10 kHz and −10 kHz). This type of composite waveform would be easily detectable with an FFT in an acquisition, but would not yield accurate estimates of the frequency offset and timing offset that are needed for accurate synchronization of the mobile terminal to the gateway station. Each waveform would yield a mathematical expression having two unknowns, and thus, there would be two equations and two unknowns. However, the information would be of little use in synchronization because the two waveforms would give approximately the same two equations having the same two unknowns. Ideally, the two equations are very different from each other.

It has been found that the range of the values of the differences of the instantaneous frequencies of the two component waveforms should ideally be a range of values equal to or greater than at least 10%, preferably at least 50%, and ideally at least 80%, of twice the available frequency bandwidth of the channel. For example, the range of values for the differences of the instantaneous frequencies of the up-chirp waveform 60 and the down-chirp 62 of the dual-chirp waveform 50 as shown in FIG. 4 a range between −15 kHz and +15 kHz, or a total range of 30 kHz, which is much greater than 10% (e.g. 3.6 kHz), 50% (e.g. 18 kHz), or even ideally 80% (e.g. 28.8 kHz) of twice the available bandwidth of the channel (e.g. 36 kHz, which is 2×18 kHz).

It is also noted that the component waveforms of such a composite waveform used for synchronization do not have to vary linearly with time, or even intersect on a frequency versus time plot as does the dual-chirp waveform 50 of FIG. 4. Thus, the composite waveform be any composite waveform that meets the above stated three design parameters. These three design parameters will be discussed further throughout the specification. Furthermore, as described later in the specification, it will become apparent that the dual-chirp waveform 50 is a preferred embodiment. The distinct advantages of the dual-chirp waveform 50 over other composite waveforms that fit within the three design parameters will be explored also below.

Referring next to FIGS. 5A through 5D, shown are illustrations of a frequency versus time plot of the transmitted dual-chirp waveform (of the embodiment shown in FIGS. 3 and 4) including the combined up-chirp waveform and down-chirp waveform that is transmitted from the gateway station 24 to the mobile terminal 12 of the satellite communications system of FIG. 1, and how the received dual-chirp waveform is effected by frequency and timing offsets.

Figure 5A:
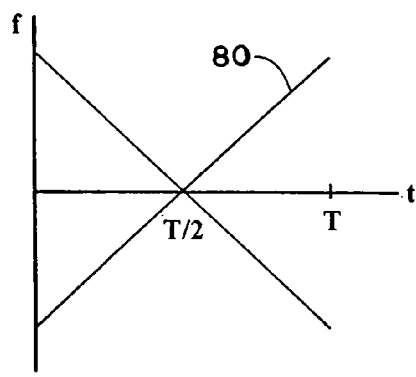
FIG. 5A illustrates a frequency versus time plot of the composite waveform of FIGS. 3 and 4, shown as the dual-chirp waveform including the up-chirp waveform and the down-chirp waveform, that is transmitted from the gateway station 24 of the satellite communications system of FIG. 1.

First referring to FIG. 5A, a frequency versus time plot is shown of the transmitted dual-chirp waveform 80 of the embodiment shown in FIGS. 3 and 4, including the combined up-chirp waveform and down-chirp waveform as earlier described above. Additionally, in FIG. 5A, the dual-chirp waveform 80 represents the received dual-chirp waveform in ideal conditions with no frequency or timing offsets. Thus, the transmitted source signal (i.e. transmitted dual-chirp waveform 80) equals the received signal (i.e. the received dual-chirp waveform 80); therefore, $s(t)=r(t)$ from FIG. 2. Note that for illustration purposes, the effects of noise are neglected.

Figure 5B:
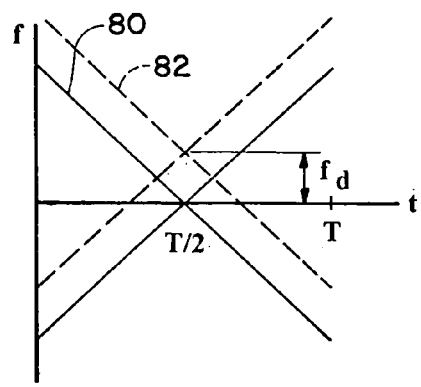
FIG. 5B illustrates a frequency versus time plot of the composite waveform of FIG. 5A and the corresponding received composite waveform (dashed line) that is received at the mobile terminal 12 of FIG. 1, wherein a frequency offset has been introduced into the composite waveform received.

Next referring to FIG. 5B, an illustration is shown of a frequency versus time plot of the transmitted dual-chirp waveform 80 of FIG. 5A and the corresponding received dual-chirp waveform 82 (dashed line) that is received at the mobile terminal 12 of FIG. 1, wherein a frequency offset $f_d$ only (no timing offset) has been introduced into the received dual-chirp waveform 82. Note that in reality the received dual-chirp waveform 82 will be effected by noise (i.e. noise 40 of FIG. 2) and will appear distorted instead of as the straight and undistorted dashed lines of FIG. 5B. For illustration purposes, straight and undistorted dashed lines are used for the received dual-chirp waveform 82.

Figure 5C:
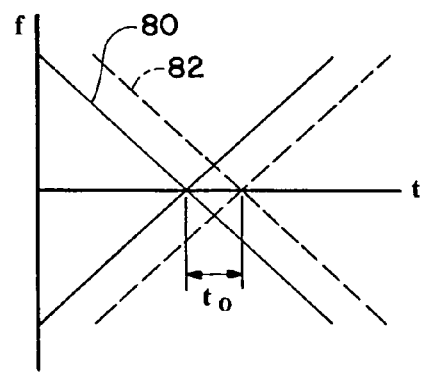
FIG. 5C illustrates a frequency versus time plot of the composite waveform of FIG. 5A and the corresponding received composite waveform (dashed line) that is received at the mobile terminal 12 of FIG. 1, wherein a timing offset has been introduced into the composite waveform.

Next referring to FIG. 5C, an illustration is shown of a frequency versus time plot of the transmitted dual-chirp waveform 80 of FIG. 5A and the corresponding received dual-chirp waveform 82 (dashed line), wherein a timing offset to only (no frequency offset) has been introduced into the received dual-chirp waveform 82.

Figure 5D:
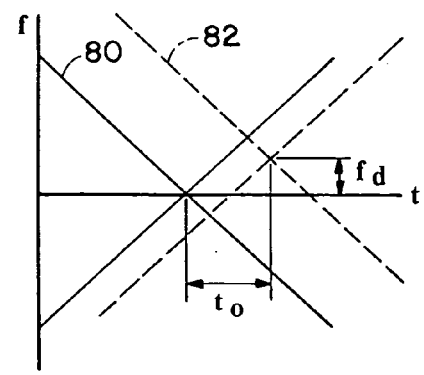
FIG. 5D illustrates a frequency versus time plot of the composite waveform of FIG. 5A and the corresponding received composite waveform (dashed line) that is received at the mobile terminal 12 of FIG. 1, wherein both a frequency offset and a timing offset have been introduced into the composite waveform.

Next referring to FIG. 5D, an illustration is shown of a frequency versus time plot is shown of the transmitted dual-chirp waveform 80 of FIG. 5A and the corresponding received dual-chirp waveform 82 (dashed line), wherein both a frequency offset $f_d$ and a timing offset $t_0$ have been introduced into the received dual-chirp waveform 82. This illustration is the most common result in that both a frequency and timing offset have been introduced into the received dual-chirp waveform 82. However, the receiver of the mobile terminal does not know either offset. Thus, the use of two component waveforms, the up-chirp waveform and the down-chirp waveform provide a means for accurate estimation of both timing and frequency offset. For example, the received up-chirp waveform mathematically yields, through the use of a FFT, a single equation having two unknowns, e.g. $f_d$ and $t_0$ and the frequency of the peak of the received up-chirp waveform (obtained in an FFT described in FIG. 7). Similarly, the received down-chirp signal mathematically yields, through the use of a FFT, a different single equation having two unknowns, e.g. $f_d$ and $t_0$ and an estimate of the peak frequency of the down-chirp waveform (from the FFT, as described in FIG. 7). Therefore, both the frequency offset and the timing offset can be accurately estimated as will be described in more detail with reference to FIGS. 7 though 10.

In contrast to frequency versus time plots of FIGS. 5A through 5D, the frequency versus time plots of FIGS. 6A through 6D show a composite waveform that does not meet the third design parameter as described above, and thus, will not be able to distinguish between the frequency and timing offsets.

Figure 6A:
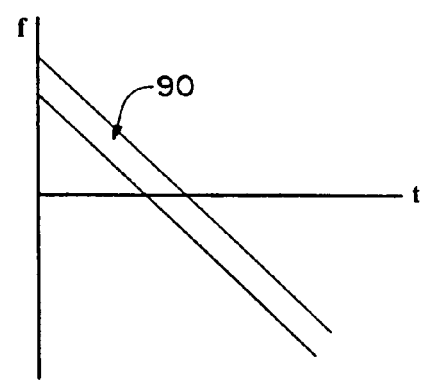
FIG. 6A illustrates a frequency versus time plot of the composite waveform of FIG. 4A, shown as two down-chirp waveforms, that would not provide accurate frequency and timing offset estimations at the mobile terminal, in contrast to the composite signal waveform as shown and described in FIGS. 3 through 4 and 5A through 5D, wherein the average of the difference between the instantaneous frequencies of the two component waveforms of the composite waveform over the duration of the composite waveform is not large.

Referring next to FIG. 6A, an illustration is shown of a frequency versus time plot of a transmitted composite waveform 90 that would not provide accurate frequency and timing offset estimations at the mobile terminal, in contrast to the composite waveforms meeting the three design parameters, e.g. the dual-chirp waveform 50 as shown in FIGS. 3 through 5D. The transmitted composite waveform 90 includes two down-chirp waveforms wherein the range of differences between the instantaneous frequencies of the two individual down-chirp waveforms of the composite signal waveform 92 over the duration of the composite signal waveform 92 is not large. As shown and further described with reference to FIG. 4A, this range of values is actually zero.

Figure 6B:
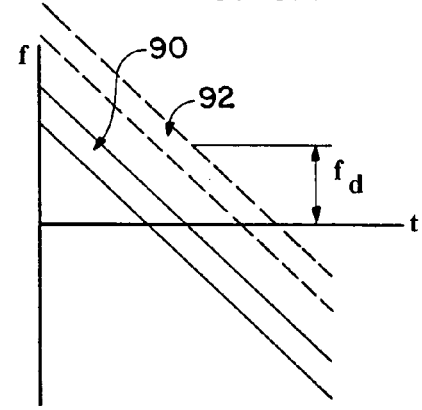
FIG. 6B illustrates a frequency versus time plot of the composite waveform of FIG. 6A and the corresponding received composite waveform (dashed line) that would be received at a mobile terminal, wherein a frequency offset has been introduced into the received composite waveform.

Referring next to FIG. 6B, a frequency versus time plot is shown of the transmitted composite signal waveform 90 of FIG. 6A and the corresponding received composite signal waveform 92 (dashed line) that would be received at the mobile terminal, wherein a frequency offset $f_d$ has been introduced into the received composite signal waveform 92.

Figure 6C:
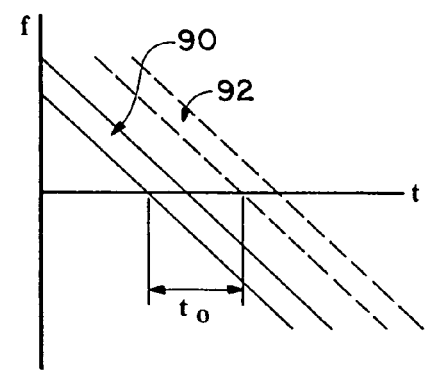
FIG. 6C illustrates a frequency versus time plot of the composite waveform of FIG. 6A and the corresponding received composite waveform (dashed line) that would be received at a mobile terminal, wherein a timing offset has been introduced into the received composite waveform.

Referring next to FIG. 6C, a frequency versus time plot is shown of the transmitted composite signal waveform 90 of FIG. 6A and the corresponding received composite signal waveform 92 (dashed line), wherein a timing offset $t_0$ has been introduced into the received composite signal waveform 92.

Figure 6D:
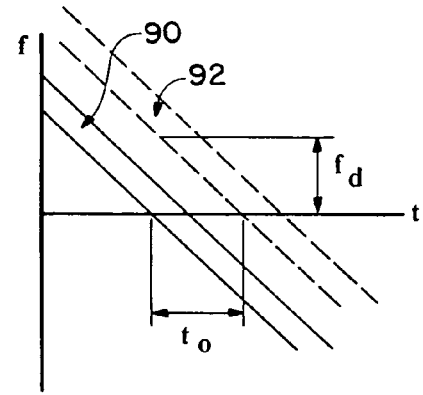
FIG. 6D illustrates a frequency versus time plot of the composite waveform of FIG. 6A and the corresponding received composite waveform (dashed line) that would be received at a mobile terminal, wherein both a frequency offset and a timing offset have been introduced into the composite waveform.

Referring next to FIG. 6D, a frequency versus time plot is shown of the transmitted composite signal waveform 90 of FIG. 6A and the corresponding received composite signal waveform 92 (dashed line), wherein both a frequency offset $f_d$ and a timing offset $t_0$ have been introduced into the received composite signal waveform 92. In operation, the receiver of the mobile terminal will be able to detect the received composite signal waveform and estimate a peak frequency of the two down-chirp waveforms using an FFT; however, the receiver will be unable to accurately estimate $f_d$ and $t_0$. This is because each individual down-chirp waveforms will mathematically yield, through the use of a FFT, a single equation having two unknowns, e.g. $f_d$ and $t_0$ and the known (estimated) peak frequency of both down-chirps. However, each equation essentially provides the same information and thus, is not effectively solvable for the two unknowns, $f_d$ and $t_0$.

Acquisition of the Composite Signal Waveform

This section deals with the acquisition of the composite waveform, specifically the dual-chirp waveform described above, that sent from the gateway station to the mobile terminal via the satellite in the satellite communications systems of FIG. 1 and used for synchronization purposes. Thus, the acquisition process involves searching for the composite waveform at the mobile terminal in an acquisition system of the mobile terminal.

Figure 7:
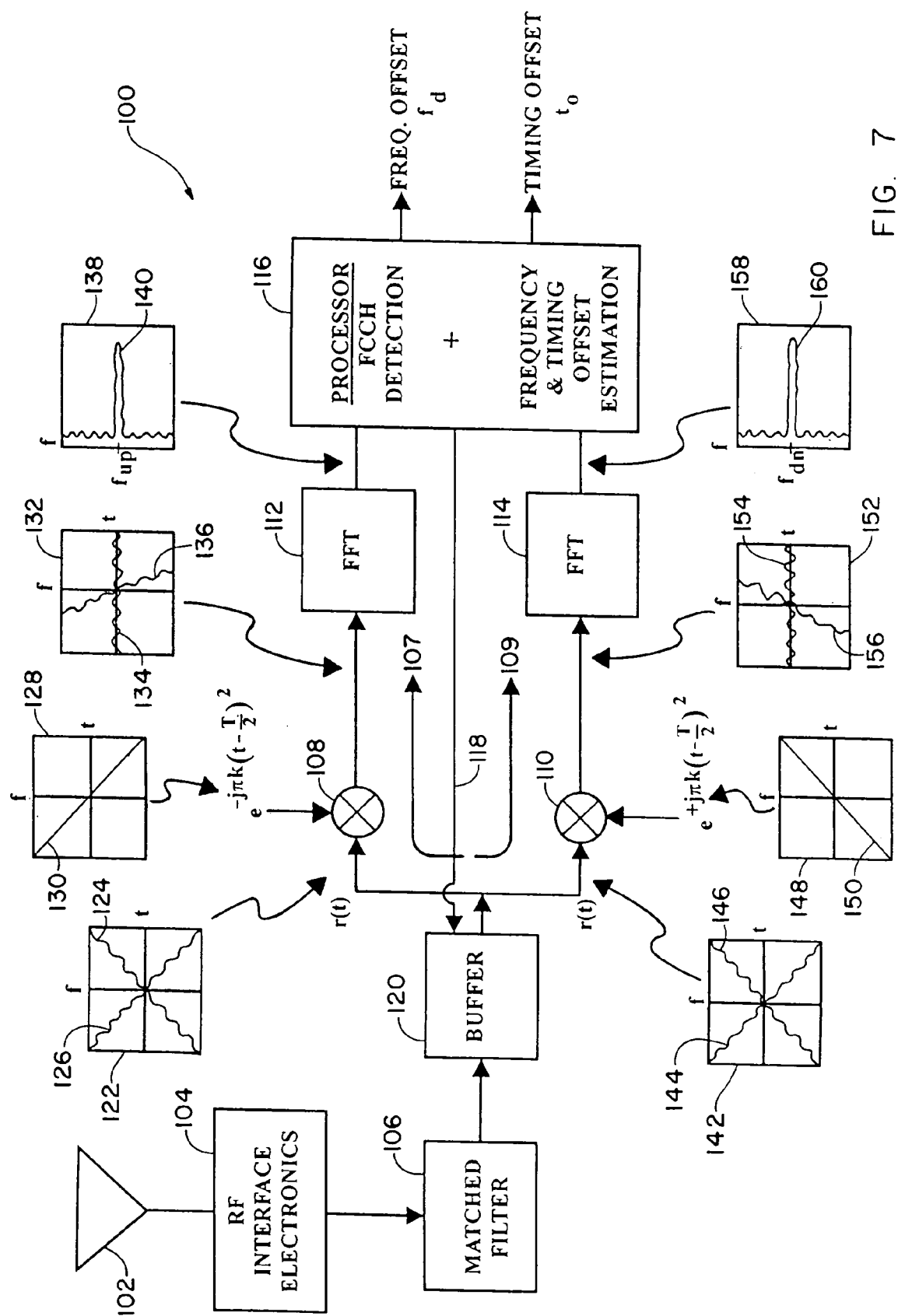
FIG. 7 is a block diagram of an Acquisition System found in the mobile terminal 12 of FIG. 1 that illustrates acquisition of the composite waveform, which is shown as a dual-chirp waveform, such that a desweeping search algorithm is used for detection of the composite waveform, which then enables synchronization of the mobile terminal to the satellite communication system of FIG. 1.

Referring next to FIG. 7, a block diagram is shown of an acquisition system as may be employed e.g. in a mobile terminal 12 of FIG. 1 for acquiring composite waveforms sent as bursts and received having the distortions described by FIG. 2, including frequency and timing offsets (see FIG. 5D) and also including the effects of noise. The acquisition system 100 comprises an antenna 102 coupled at an output to an input of an RF interface electronics 104, which is coupled at an output to an input of a matched filter 106, e.g. a Square Root Raised Cosine (SRRC) matched filter. The matched filter 106 output is coupled a buffer 120 which is coupled to both a first phase shifter 108 and a second phase shifter 110. The first phase shifter 108 and the second phase shifter 110 are each coupled at respective outputs, to an input of a first FFT processor 112 and an input of a second FFT processor 114. A Burst Detection and Parameter Estimation Processor 116 (hereinafter referred to as the detection and estimation processor 116) receives, as one input, the output from the first FFT Processor 112, and as another input, the output from the second FFT Processor 114. Furthermore, the detection and estimation processor 116 includes a control signal 118 back to the buffer 120. Also, the detection and estimation processor 116 includes a burst detector (not shown), a parameter estimator (not shown), and a Discrete Fourier Transform (not shown).

Also shown in FIG. 7 are frequency vs. time plots 122, 128, 132, 142, 148, and 152 of the waveforms at various points and frequency vs. magnitude of an FFT plots 138 and 158 and in the acquisition system. Furthermore, first path 107 and second path 109 are shown. The first path 107 is represented as the path taken by a sampled signal going from the buffer 120 to the first phase shifter 108, then to the first FFT processor 112, and finally to the detection and estimation processor 116. The second path 109 is represented as the path taken by a sampled signal going from the buffer 120 to the second phase shifter 110, then to the second FFT processor 114, and finally to the detection and estimation processor 116.

In practice, the antenna 102 receives a burst from a FCCH logical channel, which the gateway station has been configured to transmit a burst containing a composite waveform according to one embodiment of the present invention. In this particular embodiment, the composite waveform comprises a dual-chirp waveform as described above with reference to FIGS. 3–4 and 5A–5D. Also, in this embodiment, the dual-chirp waveform is a burst having a length of 5 msec that is transmitted every 320 msec by the gateway station.

During acquisition at the mobile terminal, the acquisition system 100 searches a defined set of carriers (e.g. searches 10 channels of approximately 1000 available channels) for the burst containing the dual-chirp waveform. As earlier described, once found, the dual-chirp waveform is used to determine the frequency offset and timing offset of the received dual-chirp waveform, which is used to compute the carrier frequency and frame timing information for communications back to the gateway station from the mobile terminal via the satellite. Thus, the mobile terminal has completed acquisition and the mobile terminal is now synchronized with the gateway station. As earlier explained, the dual-chirp waveform happens to be "real" in that a baseband equivalent waveform is represented mathematically in one single dimension, in contrast to how Quadrature Phase Shift Keying (QPSK) baseband waveforms are represented.

In one preferred embodiment, an initial burst is received in analog form by the antenna 102, is transformed into digital format by the RF interface electronics 104, which may employ any type of standard A/D conversion methods or means known in the art.

Then, the matched filter 106, such as an SRRC matched filter 106, filters the output of the RF interface electronics 104 and the buffer 120 samples the digital time-domain samples, i.e. complex in-phase (I) and quadraphase (Q) digital samples, from the received burst containing the dual-chirp waveform and stores them. The buffer 120 samples the digital time-domain samples at the output of the matched filter 106 at a sample frequency $f_s$, e.g. 46.8 kHz. This equates to 234 digital time-domain samples taken at 46.8 kHz during the 5 msec duration of the dual-chirp waveform.

The digital time-domain samples, complex I and Q samples, sampled by the buffer 120 are split into two paths, shown as the first path 107 and the second path 109. First, the digital time-domain samples, represented as r(t) in FIG. 7, are sent along the first path 107 to the first phase shifter 108 in order to isolate the up-chirp waveform. At this point, the samples are not yet sent along the second path 109. This is done only after the up-chirp waveform is detected in the first path 107.

A frequency vs. time plot 122 of r(t), the digital samples output from the buffer 120, is shown. Advantageously, this plot 122 is shown as actually containing the received dual-chirp waveform including the effects of noise (indicated as uneven, distorted lines instead of straight lines shown earlier in FIGS. 4 through 5A) and including an unknown frequency and timing offset. The frequency vs. time plot 122 illustrates both the up-chirp waveform 124 and the down-chirp waveform 126. The unknown frequency and timing offsets are represented in FIG. 5D.

Note that for illustration purposes to show how the dual-chirp waveform is detected in the acquisition system 100, it is presumed that the burst (a set of time domain digital samples) that has been sampled at the buffer 120 of the mobile terminal is the full dual-chirp waveform. However, the mobile terminal must "search" for the 5 msec dual-chirp waveform that occurs every 320 msec over a variety of frequencies using the sliding search window as described below. Thus, most of the time, the burst sampled at the buffer 120 is just random noise or a portion of the dual-chirp waveform, not the full dual-chirp waveform shown in frequency vs. time plot 122 at the output of the buffer 120 in the first path 107. As such, each set of digital time-domain samples sampled at the input buffer 120 is called a hypothesized waveform, since the acquisition system 100 is hypothesizing that the composite waveform is contained within the set of samples at the buffer 120.

It is important to note that first path 107 is used to detect one of the two component waveforms of the composite waveform. In the case of the dual-chirp waveform, the acquisition section is looking for the up-chirp in the first path 107, but could be configured to look for the down-chirp waveform if desired. Thus, the acquisition system 100 is hypothesizing that the signal within the buffer 120 is the dual-chirp waveform. Next, the signal output from the matched filter 106 is "deswept" at the first phase shifter 108, which is typically a multiplier, by multiplying the signal r(t) by a first desweeping waveform. The first desweeping waveform is the complex conjugate of the component waveform that the acquisition system is attempting to find in the first path 107 (i.e. the up-chirp waveform). Thus, in this case, the first desweeping waveform 130 is the complex conjugate of the up-chirp waveform, which advantageously happens to be the down-chirp waveform of the dual-chirp waveform 130, shown as $\exp(-jk(t-T/2)^2)$. A frequency vs. time plot 128 is shown that represents the first desweeping waveform 130. The first desweeping waveform 130 may also be referred to as a first hypothesizing waveform since it is being used to "hypothesize" an up-chirp waveform in the received waveform.

Since multiplication in the time-domain is addition in the frequency domain, the result of such desweeping at the first phase shifter 108 is shown as the frequency vs. time plot 132 in which the frequency of the received up-chirp waveform 134 is now simply leveled out or "deswept" into a "tone" that includes noise (also referred to as a narrow band waveform), and the phase shifted down-chirp waveform 136 has undergone a doubling of its slope, thus, the signal has been phase shifted. Note that any spurs present in the RF interface electronics 104 will no longer be tonal in nature due to the desweeping process.

The term "deswept" is used because the first desweeping waveform 130 is designed to desweep or flatten out the frequency vs. time plot of one of the component waveforms of the composite waveform (turn it into a narrowband waveform); in this case, the up-chirp waveform (i.e. frequency is swept over time) so that the frequency of the up-chirp waveform does not change linearly with time and results in a deswept up-chirp waveform that has approximately a constant frequency, like a "tone". The other component waveform of the composite signal waveform, for example, the down-chirp waveform component of the dual-chirp waveform, is amplified (in frequency) and isolated from the deswept up-chirp waveform 134 (now a tone waveform including noise), so that the detection and estimation processor 112 can be used to detect the "tone" of the deswept up-chirp waveform.

Furthermore, the desweeping at the first phase shifter 108 can be implemented by a computer program in a software implementation, or in firmware or hardware in alternate embodiments. For example, using software or firmware, if the buffer 120 output (complex I and Q outputs) are initially B_I(n) and B_Q(n), n being a sample number, then for n=0 to 233, the filtered and buffered output is represented by: B_I(n)+jB_Q(n). Furthermore, if the up-chirp conjugate is represented using table coefficients α and β, then the conjugate is [α(n)+j β(n)].

Next, the deswept component waveform (shown as the deswept up-chirp waveform 134 in frequency vs. time plot 132) is sent to the first FFT Processor 112 to be Fast Fourier transformed into an initial frequency-domain signal. In the embodiment shown, wherein the dual-chirp waveform is 5 msec in length and the buffer 120 samples 234 digital samples, a "256 point FFT" is used in the first FFT processor 112. Thus, as is known in the art, a zero padder (not shown) within the first FFT processor 112 is used to zero pad the last 22 samples for the 256 point FFT, i.e. set the last 22 samples equal to zero. Thus, the first 234 samples (n=0 to n=233) of phase shifted digital time domain samples are sent to the 256 point FFT, and the last 22 samples (n=234 to n=255) are set to zero and sent to the 256 point FFT of the up-chirp FFT processor 112. In different embodiments, a zero padder may be unnecessary or a different size FFT may be used depending on the size of the dual-chirp waveform and the number of samples taken at the buffer 120.

The first FFT processor 112 transforms the phase-shifted, zero-padded I and Q samples or output from the first phase shifter 108, which are in time-domain, into frequency domain I and Q samples, as is known in the art. A frequency vs. magnitude plot 138 is shown of the output of the first FFT processor 112 which extracts and isolates the deswept up-chirp waveform 134 or tone indicated by the peak 140 of the plot 138. This peak 140 of the plot 138 may be referred to as frequency representation of the deswept up-chirp waveform 134.

The resulting signal is sent from the first FFT processor 112 to the detection and estimation processor 116 which is used to detect the presence of a peak 140, or frequency representation of the deswept up-chirp waveform 134, which indicates the presence of the up-chirp waveform 124 of the dual-chirp waveform as described above.

In order to detect an actual up-chirp waveform (represented at this point as the frequency representation of the deswept up-chirp waveform 140 or peak 140) in the received digital samples, the detection and estimation processor 116 searches the output of the first FFT processor 112 by comparing a signal-to-noise ratio (i.e. SNR) of the output of the first FFT processor to an SNR Threshold. A signal-to-noise ratio (SNR) is next computed from a ratio of signal-power/noise-power. A SNR is calculated by determining a maximum power among all frequency bins containing output from the first FFT Processor 112, as detailed in the following description.

In calculating the SNR, first, a Bin Power is calculated for all of the frequency bins by adding the squares of the frequency domain I samples to the squares of the frequency domain Q samples for each sample n.

A Maximum Power Bin of location m is determined from amongst all the bin powers. The SNR is next computed by adding energies (Bin Powers) of bins (m−1) through bins (m+1). A Noise Power is computed as a sum of remaining power from remaining bins, i.e. all bins except for the remaining bins wherein n={(m−1), m, (m+1)}. Also, there are unlimited other methods of computing an SNR known in the art, any of which may be employed herewith in accordance with the principles of this invention.

Next, the computed SNR is compared against a computed SNR Threshold resulting in one of two scenarios. In the first scenario, if the signal-to-noise ratio (SNR) computed exceeds the SNR threshold, then the detection and estimation processor 116 knows that it has received the composite signal waveform, e.g. the dual-chirp waveform, since the frequency representation of the deswept up-chirp waveform will cause the SNR threshold to be exceeded. Once exceeded, the detection and estimation processor has found the up-chirp component waveform of the dual-chirp waveform. Alternatively, in the second scenario, if the computed SNR does not exceed the SNR threshold, i.e. there is no peak 140, then the detection and estimation processor knows that it has not received the composite signal waveform, e.g. the dual-chirp waveform.

More specifically, in the second scenario, if an up-chirp waveform, i.e. the frequency representation of the deswept up-chirp waveform or tone, is not detected (i.e. the SNR threshold has not been exceeded), the buffer 120 is instructed, through control signal 118 to sample more digital time-domain samples from the receiver at a time offset, e.g. half of a timeslot or 833 µsec of a three timeslot, 5 msec burst. These additional digital time-domain samples are sampled according to a sliding search window as described further with reference to FIG. 8. As before, the digital time-domain samples now in the buffer 120 are sent along first path 107 again, repeating the process of looking for one of the two component waveforms of the composite signal waveform, in this case, looking for the up-chirp waveform of the dual-chirp waveform. Further time-domain samples are processed in a like manner until the up-chirp signal is detected by the burst detection processor 116, i.e. the signal threshold has been exceeded, as described above.

In the first scenario, where the SNR threshold has been exceeded, it must also be determined whether the "peak" of the up-chirp waveform, or the input buffer containing the "largest portion" of the up-chirp waveform, has been found. It is important to note that so far, the discussion has assumed (for illustration purposes) that the peak of the dual-chirp waveform, i.e. the entire dual-chirp waveform, has been sampled at the buffer 120; however, in reality, the SNR threshold will exceeded in cases where less than the entire dual-chirp waveform has been sampled at the buffer 120. For example, the 234 samples (equating to 5 msec, which is the length of the dual-chirp waveform, of samples taken at 46.8 kHz) from may only contain 180 samples of the dual-chirp waveform and 54 samples of noise, which may cause the SNR threshold to be exceeded depending on the configuration. Thus, once the SNR threshold has been exceeded by the computed SNR of the current digital samples at the buffer 120, the detection and estimation processor 116 instructs the buffer 120 (through control signal 118) to sample more digital time domain samples from the matched filter 106.

This creates a sliding search process for the composite signal waveform, e.g. the dual-chirp waveform, on the FCCH. As such, a second input buffer containing samples with ½ slot delay, for example, from a first input buffer (which caused the SNR threshold to be exceeded) is received at the sample buffer 120 and processed as above in the first path 107 to detect one of the component waveforms, again, the up-chirp waveform and compute a second SNR of the frequency representation of the deswept up-chirp waveform in the second input buffer. The second SNR is compared with the first SNR, as computed above. If the second SNR is greater than the first SNR, then a further iteration of processing (involving a third input buffer offset from the second input buffer by one half of a slot) is performed and current samples are maintained for future processing, as detection is yet to occur. However, if the second SNR is not greater than the first SNR, then the first input buffer (that caused the SNR threshold to be exceeded) contains the "peak" of the up-chirp waveform, or the portion of the up-chirp waveform having the highest SNR, i.e. a "peak SNR". Each iteration process is performed in less than ½ slot, or 833 µsec if the 5 msec burst occupies three timeslots. When the new input buffer is received, a sliding window counter is incremented to change the choice of slots to be received by a next buffer. The sliding search window is further described with reference to FIG. 8.

Next, following the first scenario, once the set of digital time-domain samples containing the "peak" of the up-chirp waveform 124 from peak 140 (the frequency representation of the deswept up-chirp waveform) is detected (from the SNR that exceeds the SNR threshold the most), then this indicates that the largest portion of the dual-chirp waveform has been received at the antenna 102 and the set of digital time-domain samples now stored in buffer 120 are then sent along second path 109, which is analogous to the first path 107 except that the second path 109 is looking for the other of the two component waveforms. In this case, the digital time-domain samples (which have previously been determined to contain the "peak of the up-chirp waveform, and thus, the "peak of the down-chirp waveform) are sent in the path 109 so that the down-chirp waveform can be deswept and isolated into a corresponding tone to be detected also at the detection and estimation processor 116.

Thus, the detection and estimation processor sends control signal 118 to the buffer 120 in order to begin sending the digital time-domain samples stored in the buffer 120 along the second path 109. Again, the second path 109 is only taken when the peak of the up-chirp waveform has been detected at by the burst detection processor 116 in the first path 107; thus, the peak of the down-chirp waveform will be detected now in the second path 109.

Following the second path 109, the time-domain digital samples at the buffer 120 are sent to the second phase shifter 110. A frequency vs. time plot 142 is shown of the received dual-chirp waveform, showing both the down-chirp waveform 144 and the up-chirp waveform 146. The second phase shifter 110 desweeps the signal time-domain digital samples, i.e. r(t), with a second desweeping waveform 150, which is the complex conjugate of the component waveform that is to be detected in the second path 109, e.g. the down-chirp waveform of the dual-chirp waveform, but it could be the second of two component waveforms of a composite signal waveform. In this case, the complex conjugate of the down-chirp waveform is advantageously the up-chirp waveform, which is shown as the second desweeping waveform 150 of the frequency vs. time plot 148 and also represented mathematically as $\exp(+jk(t-T/2)^2)$.

The resulting signal from the desweeping at the second phase shifter 110 is shown as frequency vs. time plot 152. The deswept down-chirp waveform 154, now a tone including noise (i.e. a narrow band waveform), and the phase shifted up-chirp waveform 156 are shown. Note that the frequency of the up-chirp waveform has been shifted, i.e. doubled, which is shown as the phase shifted up-chirp waveform 156. The output of the second phase shifter 110 is then sent to the second FFT processor 114, which is similar to the first FFT processor 112, which translates the time-domain signal into a frequency-domain signal including a frequency representation of the deswept down-chirp waveform 160 (or the peak 160) of frequency vs. magnitude plot 158, similar to the process performed in the first path 107.

The peak 160 is the frequency representation of the deswept down-chirp waveform which indicates the presence of the actual down-chirp waveform. Additionally, zero padding may be done at the second FFT processor 114 as needed.

Next, the output of the second FFT processor 114 is sent to the detection and estimation processor 116; however, since the set of buffer samples containing the largest portion of the down-chirp waveform has already been found (since the first path has confirmed that set of buffer samples already contains the largest portion of the up-chirp waveform has been found), the detection and estimation processor 116 does not try to detect the down-chirp waveform and perform the SNR computation or the sliding search window.

Next, since both component waveforms of the composite waveform, i.e. the up-chirp and down-chirp waveforms of the dual-chirp waveform, the detection and estimation processor 116 estimates the frequency of the of the frequency representation of the deswept up-chirp waveform, which is the frequency at the peak 140 of the tone and is referred to as $f_{up}$. This process is common in prior art acquisition systems that process tone waveforms only, and is well known in the art. One important distinction between such a prior art system and this embodiment of the present invention, however, is that the waveform sent in this embodiment is not a tone, but a composite waveform, e.g. a dual-chirp waveform, wherein the component waveforms are deswept into tones after the possibility of incurring "spurs" into the waveform has passed. However, once deswept into tones, the detection and estimation processor 116 estimates the frequency of the tone at the peak 140.

Similarly, the frequency of the frequency representation of the deswept down-chirp waveform or peak 160 is estimated at the detection and estimation processor 116, which is referred to as $f_{dn}$.

Furthermore, a Discrete Fourier Transform (DFT) may be performed around peaks 140 and 160 (i.e. the frequency representations of the deswept up-chirp waveform and the deswept down-chirp waveform) of the output of the FFT to further refine the frequency estimated at the peaks 140 and 160, i.e. $f_{up}$ and $f_{dn}$. This is further described with reference to FIG. 9.

Both of these estimates, i.e. the frequency estimate of the frequency representation of the deswept down-chirp waveform $f_{dn}$ and the frequency estimate of the frequency representation of the deswept up-chirp frequency $f_{up}$, each have an unknown frequency offset and an unknown timing offset associated with them. This is represented in FIG. 5D, wherein the received down-chirp waveform and the received up-chirp waveform are both shown as having an unknown frequency offset, i.e. $f_d$, and an unknown timing offset, i.e. $t_0$. Furthermore, a relationship exists between the frequency of deswept up-chirp waveform $f_{up}$, $f_d$, and $t_0$, such that:

$$f_{up}=f_d-Kt_0 \quad (5)$$

where K is the known sweep parameter or frequency rate-of-change of the up-chirp waveform.

Furthermore, a similar relationship exists between the frequency of deswept down-chirp waveform $f_{dn}$, $f_d$, and $t_0$, such that:

$$f_{dn}=f_d+Kt_0 \quad (6)$$

where $K_2$ is the known sweep parameter or frequency rate-of-change of the down-chirp waveform.

Since $f_{up}$, $f_{dn}$, K are known, the two Equations (5) and (6) can be solved for the frequency offset $f_d$, and the time offset $t_0$ which are needed for the mobile terminal to synchronize with the gateway station as in Equations (7) and (8).

$$f_d=0.5(f_{up}+f_{dn}) \quad (7)$$

$$t_0=(f_{up}-f_{dn})/2K \quad (8)$$

Thus, the frequency offset $f_d$, and the time offset $t_0$ are estimated and output from the detection and estimation processor 116. It is important to note that Equations (5) through (8) only hold true in the specific example shown, in the case of the dual-chirp waveform. Furthermore, these equations only apply when the hypothesized waveform, i.e. the received waveform that contains the largest portion of the dual-chirp waveform, begins at t=0 sec. However, depending on the type of composite waveform sent, the skilled artist could derive the relationships needed to solve for the frequency offset $f_d$ and the time offset $t_0$. Additionally, the frequency offset and timing offset estimations are further described with reference to FIG. 9 below.

Advantageously, the matched filter 106, buffer 120, first phase shifter 108, second phase shifter 110, first FFT processor, second FFT processor, and the detection and estimation processor 116 of the acquisition section 100 can be implemented as an application specific integrated circuit (ASIC) or a digital signal processor.

Figure 8:
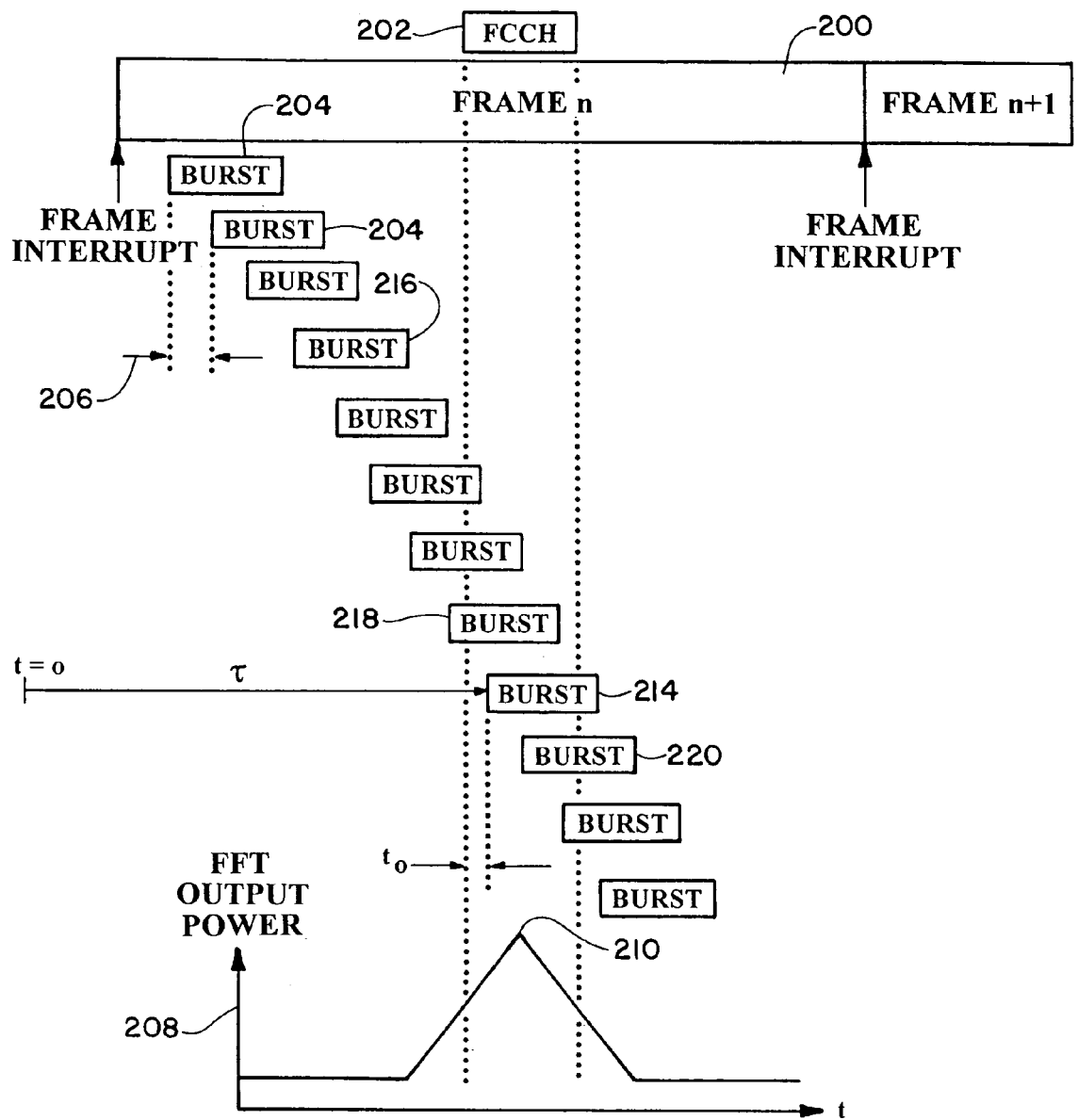
FIG. 8 is an illustration of a sliding window process used by the acquisition system of FIG. 7 to scan for the composite signal waveform.

Referring next to FIG. 8, a sliding window search process or algorithm is illustrated as may be implemented by the search algorithms employed by the detection and estimation processor 116 in the acquisition system 100 of FIG. 7. Shown is the frame 200 including the burst 202 that contains the composite waveform, e.g. the dual-chirp waveform, sliding search windows 204 each offset from each other by a specified time 206. Also shown is an FFT output power vs. time plot 208 having a peak 210 at the center of the burst 202 containing the dual-chirp waveform.

In this particular embodiment, a 5 msec burst 202 is transmitted once every frame 200, or 320 msec, by the gateway station of the satellite communications system of FIG. 1. Thus, the sliding search windows 204 are 3 slots totaling 5 msec, wherein each slot is 1.67 msec in length. In between iterations, the sliding search windows 204 are moved the specified time 206, which is shown as one half of a slot or 833 μsec. It is noted that all of these parameters can be varied easily by the skilled artist. Note also that each sliding search window 204 has a particular fixed overlap.

Each sliding search window 204 contains digital time-domain samples sampled at the buffer 120 of FIG. 7; thus, each sliding search window 204 has "an input buffer" associated therewith. Furthermore, as illustrated, the burst 202 does not exactly correspond to the exact timing of the sliding search windows 204; thus, there is a time offset 212 (i.e. $t_0$) between the sliding search window (shown as sliding search window 214) that contains the largest portion (or peak) of the dual-chirp waveform, as described in FIG. 7, and the actual burst 202 containing the dual-chirp waveform.

Furthermore, a time τ is defined as a time at which each sliding search window 204 begins. For example, τ is shown as the point in time that sliding search window 214 begins, but is also the time that any sliding search window begins. The time τ is illustrated mathematically in FIG. 9. Note also that every sliding search window 204 contains a hypothesized waveform, since the process is hypothesizing that the digital samples contained within each sliding search window 204 are the composite waveform, when most of the time, they are not the composite waveform.

This sliding search window diagram is related to the acquisition section 100 of FIG. 7 in that sliding search windows 204 located away from the location of the burst, e.g. sliding search window 216, will be sampled at the buffer 120, sent through the first path 107 and the SNR threshold will not be exceeded (as described in FIG. 7). Thus, the buffer 120 will be instructed to sample a new sliding search window until the SNR threshold has been exceeded.

Furthermore, sliding search windows 218, 214, and 220 may all cause the SNR threshold to be exceeded; however, as can be seen, the input buffer containing sliding search window 214 will contain the "peak" of the dual-chirp waveform. Thus, as described in FIG. 7, the detection and estimation processor 116 will cause the buffer 120 to sample sliding search windows 214 and 220, even though the SNR threshold has been exceeded by sliding search window 218, until the input buffer (i.e. the set of samples in buffer 120 that correspond to sliding search window 214) that contains the "largest portion" or peak of the burst 202 is found, i.e. sliding search window 214.

Thus, the sliding search window process is used to scan across the entire frame 200 looking for the burst 202 containing the composite signal waveform, in this case, the dual-chirp waveform. Once found, the detection and estimation processor 116 of FIG. 7 then performs the above described steps to estimate a frequency offset and a timing offset of the burst enabling synchronization.

Figure 9:
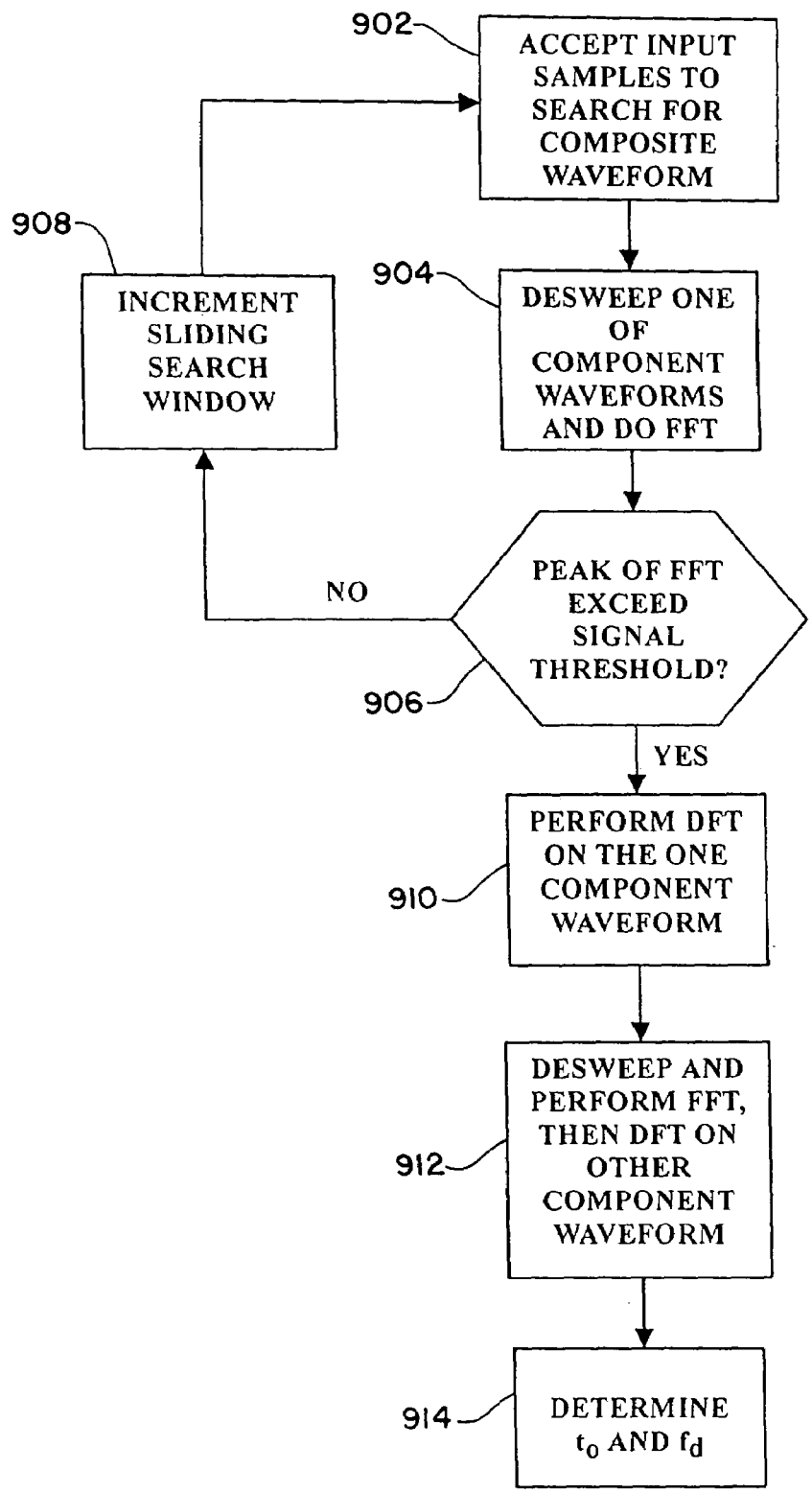
FIG. 9 is a flow chart of the steps performed for acquisition of the composite waveform, which is illustrated as the dual-chirp waveform of FIGS. 3 and 4, which may be implemented by the acquisition system 100 of FIG. 7 of the mobile terminal 12 of the satellite communications system of FIG. 1.

Referring next to FIG. 9, a flow chart is shown of an exemplary search algorithm employing a composite waveform, specifically the dual-chirp waveform as illustrated in FIGS. 3 and 4 in conjunction with the acquisition section of FIG. 7 and the sliding search windows of FIG. 8.

First, digital time-domain samples (hereinafter referred to as "input samples") are sampled (Step 902) for a time T in order to search for the composite waveform, e.g. the dual-chirp waveform. This step is typically performed by an input buffer (e.g. buffer 120) at an acquisition section (e.g. acquisition section 100) of a mobile terminal. Time T is typically a length of time corresponding to the length of the burst that contains the dual-chirp waveform, e.g. T is 5 msec.

The input samples are first processed by desweeping a possible up-chirp waveform and performing a Fast Fourier Transform (FFT) thereon (Step 904), as described earlier herein in FIG. 7. The desweeping of the possible up-chirp waveform may be done at the first phase shifter 108 of FIG. 7 by multiplying a first desweeping waveform 130 d(t), which is the complex conjugate of the up-chirp waveform or the down-chirp waveform. The FFT may be performed at the first FFT processor 112 of FIG. 7.

Next, the signal-to-noise ratio (SNR) is computed for the frequency representation of the deswept up-chirp waveform, such as described in FIG. 7 at the detection and estimation processor 116, and compared to the SNR threshold (Step 906), as described again with reference to FIG. 7.

If the computed SNR does not exceed the SNR threshold (Step 906), then software in the detection and estimation processor 116 increments the scanning parameter by a specified time offset 206 (Step 908), shown in FIG. 8, for example, corresponding to scanning time with reference to a continuous time t. This effectively moves the sliding search window over by the specified time offset 206, e.g. 833 μsec.

If the computed SNR exceeds the SNR threshold (Step 906), then an actual up-chirp waveform is detected (as a frequency representation 140 of the deswept up-chirp waveform, i.e. peak 140 of FIG. 7), and a discrete Fourier transform (DFT) is performed (Step 910) on the input samples (within the sliding search window) by the detection and estimation processor 116, as described in briefly earlier and in more detail below.

With respect to performing a DFT, in one embodiment, fine frequency estimation using a DFT as previously described is performed as part of frequency interpolation in the detection and estimation processor 116. When the up-chirp waveform is detected as described above, a DFT is estimated around a coarse detected frequency in increments of ±20 Hz to refine the frequency estimation of the frequency representation of the deswept up-chirp waveform; thus, the measurement of $f_{up}$ in Equation (5) is refined.

As such, the DFT is represented as the equation describing a magnitude Y(m) for a group d for N samples is:

$$Y(m) = \sum_{n=0}^{N-1} x(n) e^{-j2\pi nm/N} \tag{9}$$

where X(n) is the deswept up-chirp waveform.

A peak value of a group of Y(m) values is selected at a peak frequency $F_{peak}$. If a corresponding Y(m) is denoted as $p_2$, then frequencies on each upper and lower side of $p_2$, i.e. frequencies at $p_1$ and $p_3$, are used to perform interpolation.

In one embodiment interpolation is performed using a quadratic fit; in another embodiment interpolation is performed using a sinc interpolation, which uses an infinite series to treat all such Y(m) samples as perfect samples.

For a quadratic fit, Equations (10) and (11) are used to determine estimated frequency $F_{est}$:

$$F_{adj} = 0.5 * (p_1 - p_3)/(p_1 + p_3 - 2p_2) \tag{10}$$

$$F_{est} = F_{peak} + (F_{adj} * 20.0) \tag{11}$$

Other methods for interpolation are also possible in keeping with the spirit of the present invention.

After the DFT is performed on the frequency representation of the up-chirp waveform (Step 910), the input samples, stored in the buffer 120, which correspond to the down-chirp component waveform, are deswept and an FFT and DFT are performed (Step 912), respectively. For example, this may be done in the second path 109 of FIG. 7.

Finally, the frequency offset $f_d$ and the timing offset $t_0$ of the dual-chirp waveform are estimated (Step 914) by a parameter estimator (not shown) of the detection and estimation processor 116, as described with reference to FIG. 7. The results of Steps 910 and 912 produce two frequency estimates, one for the frequency representation of the deswept up-chirp waveform and one for the frequency representation of the deswept down-chirp waveform. As described earlier, each frequency estimation, e.g. $f_{up}$ and $f_{dn}$, has an unknown frequency offset, i.e. $f_d$, and an unknown timing offset, i.e. $t_0$. Furthermore, a relationship exists between $f_{up}$, and $f_d$ and to of the received dual-chirp waveform, in Equation (5) above, and a similar relationship exists between $f_{dn}$, and $f_d$ and $t_0$ of the received dual-chirp waveform, in Equation (6) above. Thus, as described above, these relationships are both used to solve for the frequency offset $f_d$, and the time offset $t_0$ (Step 914) as can be done in Equations (7) and (8), which are required for the mobile terminal to synchronize with the gateway station. The step is simplified in the dual-chirp waveform, since both the up-chirp waveform and the down-chirp waveform have a frequency that varies linearly with time and each is the complex conjugate of the other. Thus, the up-chirp waveform and the down-chirp waveform is easily expressible in mathematical terms and equations.

Next, the following detailed mathematical analysis is presented to illustrate, mathematically, the search algorithms used in the acquisition process of FIG. 9, performed by the acquisition section of FIG. 7.

In accordance with the invention herewith, the search algorithms employed by the Acquisition System 100 accomplishes detection of the actual up-chirp waveform and the actual down-chirp wave form, as well as the frequency and time estimation, by designing a complex baseband dual-chirp signal burst as shown in FIG. 3 and represented mathematically in Equation 12.

$$s(t) = 2p(t) \cdot \cos\left[\pi K\left(t - \frac{T}{2}\right)^2\right] = s_1(t) + s_2(t) \quad (12)$$

where $$p(t)\begin{cases} 1, & 0 \le t \le T \\ 0, & \text{else} \end{cases} \quad (13)$$

and wherein $$s_1(t) = p(t) \cdot \exp\left\{j\pi K\left(t - \frac{T}{2}\right)^2\right\} \quad (14)$$

and $$s_2(t) = p(t) \cdot \exp\left\{-j\pi K\left(t - \frac{T}{2}\right)^2\right\} \quad (15)$$

In equation 10, s(t) denotes the dual-chirp waveform, transmitted as a burst to the mobile terminal before attenuation, time delays, and frequency offsets are applied during transmission of the of the dual-chirp waveform over the communications links between the gateway station and the mobile terminal. Thus, s(t) is the source signal being transmitted from the transmitter 32 in FIG. 2.

In the above equations 10 through 13, T denotes a period of the burst (e.g. 5 msec) and t denotes instantaneous time measured from the starting time of the burst in time domain. The up-chirp waveform is represented by $s_1(t)$, and the down-chirp waveform is represented by $s_2(t)$. Furthermore, p(t) is a window defining an envelope of the signal in time or a ramping function as described above at Equation (2). K is the sweep rate parameter or the frequency rate-of-change for both the up-chirp waveform and the down-chirp waveform as described in Equations (3) and (4) above. Note that advantageously, K is the same for both the up-chirp waveform and the down-chirp waveform, except that they are the opposite direction (+K and −K); however, the skilled artist could vary this relationship while at the same time vary the above equations.

A phase, φ(t), of the dual-chirp signal of duration T is equal to Equation (16).

$$\varphi(t) = \pi K\left(t - \frac{T}{2}\right)^2 \quad (16)$$

Within the burst containing the dual chirp signal, an instantaneous frequency for the up-chirp waveform, $s_1(t)$ equals K(t−T/2), wherein K is a frequency rate-of-change, and an instantaneous frequency for the down-chirp waveform $s_2(t)$ equals −K(t−T/2); therefore, instantaneous frequencies for $s_1(t)$ and $s_2(t)$ vary from $-KT/_2$ to $KT/_2$. The frequency span or frequency bandwidth of the dual-chirp signal is therefore β=KT.

Next, at the receiver 44 (i.e. the mobile terminal), the received burst containing a received dual-chirp waveform (i.e. one example of a received composite waveform), r(t) is corrupted by frequency shifting ($+e^{j2\pi f_d t}$) due primarily to Doppler, a time delay $t_0$, and by Additive White Guassian Noise (AWGN) n(t). These contributing factors are described above with reference to FIG. 2. Therefore, the received dual-chirp waveform is represented as Equation 17.

$$r(t)=A \cdot s(t-t_0)\exp\{2\pi f_d t+\phi\}+n(t)=A \cdot [s_1(t-t_0)+s_2(t-t_0)] \\ \exp\{2\pi f_s t+\phi\}+n(t) \quad (17)$$

wherein A is an amplitude of the received waveform r(t), wherein $t_0$ is the time delay or propagation delay, wherein $f_d$ is a frequency offset between the transmitter 32 and the receiver 44, which is due to Doppler frequency shifting, wherein φ is a random phase in [0,2π], and wherein n(t) is additive white Guassian noise (AGWN) having zero mean and spectral density $N_0$.

As such, the acquisition system 100 described in FIG. 7 of the mobile terminal receives this waveform. Using the mathematical representation r(t) described by Equation (17), it is possible for the acquisition system 100 to multiply r(t) with a proper desweeping waveform d(t) such that v(t)=r(t) d(t). Consistent with that described in FIG. 7, the desweeping waveform d(t) would be the complex conjugate of the waveform being searched for. In the case of the dual-chirp waveform, d(t) is the first desweeping waveform 130, which is the complex conjugate of the up-chirp waveform which is the down-chirp waveform. Such complex conjugate of the waveform begin searched for is represented at time t−τ, wherein τ is the point in time that the hypothesized composite waveform will start, as illustrated in FIG. 8.

A deswept up-chirp waveform is represented by $v_1(t)$ Equation (18) in time domain. Note that the deswept up-chirp waveform 134 is shown in the frequency domain in frequency vs. time plot 132 of FIG. 7. A deswept down-chirp waveform is represented as $v_2(t)$ by Equation (19) in time domain. Similarly, the deswept down-chirp waveform 154 is shown in the frequency domain in plot 152 of FIG. 7. Furthermore, this assumes an actual up-chirp waveform or down-chirp waveform is present in r(t).

$$v_1(t)=r(t) \cdot s_1^*(t-\tau)=v_{11}(t)+v_{21}(t)+N_1(t) \quad (18)$$

$$v_2(t)=r(t) \cdot s_2^*(t-\tau)=v_{12}(t)+v_{22}(t)+N_2(t) \quad (19)$$

wherein $$v_{11}(t) = As_1(t-t_0)s_1^*(t-\tau)\exp\{2\pi f_d t + \phi\} \quad (20)$$

-continued $$= A\exp\{j[\pi K(t_0 - \tau)(t_0 + \tau + T) +$$
$$\phi]\}\exp\left\{j2\pi K\left[(\tau - t_0) + \frac{f_d}{K}\right]t\right\} \cdot p(t - t_0)p(t - \tau)$$

$$v_{21}(t) = As_2(t - t_0)s_2^*(t - \tau)\exp\{2\pi f_d t + \phi\} \quad (21)$$
$$= A\exp\left\{-j\pi\frac{K}{2}(\tau - t_0)^2 + \right.$$
$$\left. j\phi\right\}\exp\left\{-j2\pi K\left(t - \frac{1}{2}(t_0 + \tau + T)\right)^2 + j2\pi f_d t\right\} \cdot$$
$$p(t - t_0)p(t - \tau)$$

$$v_{12}(t) = As_1(t - t_0)s_2^*(t - \tau)\exp\{2\pi f_d t + \phi\} \quad (22)$$
$$= A\exp\left\{j\pi\frac{K}{2}(\tau - t_0)^2 + \right.$$
$$\left. j\phi\right\}\exp\left\{-j2\pi K\left(t - \frac{1}{2}(t_0 + \tau + T)\right)^2 + j2\pi f_d t\right\} \cdot$$
$$p(t - t_0)p(t - \tau)$$

$$v_{22}(t) = As_2(t - t_0)s_2^*(t - \tau)\exp\{2\pi f_d t + \phi\} \quad (23)$$
$$= A\exp\{j[\pi K(\tau - t_0)(t_0 + \tau + T) +$$
$$\phi]\}\exp\left\{j2\pi K\left[(t_0 - \tau) + \frac{f_d}{K}\right]t\right\} \cdot p(t - t_0)p(t - \tau)$$

and wherein $$N_1(t) = n(t)s_1^*(t-\tau) \quad (24)$$

$$N_2(t) = n(t)s_2^*(t-\tau) \quad (25)$$

In the above Equations, $s^*_1(t-\tau)$ is the complex conjugate of $s_1(t-\tau)$ or $d_1(t-\tau)$, for example, $s^*_1(t)$ is shown as the first desweeping waveform 130 ($s^*_1(t)=d_1(t)$) in FIG. 7. Similarly, $s^*_2(t-\tau)$ is the complex conjugate of $s_2(t-\tau)$ or $d_2(t-\tau)$, for example, $s^*_2(t)$ is shown as the second desweeping waveform 150 in FIG. 7.

Furthermore $v_{11}(t)$ and $v_{22}(t)$, are shown as continuous wave signals. For example, in a frequency vs. time plot, $v_{11}(t)$ is shown as deswept up-chirp waveform 134 (which is tone-like or narrowband) of FIG. 7 and $v_{22}(t)$ is shown as deswept down-chirp waveform 154 (which is tone-like) in FIG. 7. Cross-talk terms $v_{21}(t)$ and $v_{12}(t)$ remain as wideband chirp-like signals. For example, in a frequency vs. time plot, $v_{21}(t)$ is shown as phase shifted down-chirp 136 in FIG. 7 and $v_{12}(t)$ is shown as phase shifted up-chirp 156 of FIG. 7. It can be proven that these cross-talk terms $v_{21}(t)$ and $v_{12}(t)$ carry much less power than the desired continuous wave signal (tone or sinusoid) if $KT^2=\beta T$ is large enough.

Therefore, if the frequency span or the frequency bandwidth $\beta$ of the up-chirp waveform defined earlier herein as KT, is large enough, such that $KT^2$ is comparatively large enough to be neglected in the mathematical analysis then frequency shift and time delay information can be extracted from the peak frequency.

An example of a bandwidth $\beta$ large enough to reflect the cross-talk terms would be a $\beta$ rendering the cross-talk terms (chirp-like signals) about an order of magnitude smaller than the continuous wave signals (terms). Another example of a bandwidth $\beta$ large enough for reflecting resulting cross-terms would be a $\beta$ which is about 80% of a bandwidth of an FCCH channel, for example, since an FCCH channel must have sufficient bandwidth to operate in a practical manner in a wireless communication system.

A skilled artisan will observe many other ways to set an appropriate bandwidth $\beta$ for the up-chirp and down-chirp waveform in accordance herewith.

Preferably, a bandwidth of a dual-chirp waveform and a difference bandwidth between the bandwidth of the up-chirp and the down-chirp waveform should be in an order of the available bandwidth of the FCCH channel. Minimally, the bandwidth $\beta$ should be greater than 10% of the available bandwidth of the channel.

Next, a frequency domain representation (e.g. peak 140), $V_{11}(f)$, of the time domain deswept up-chirp waveform $v_1(t)$ and a frequency domain representation (e.g. peak 160), $V_{22}(f)$ of the time domain deswept down-chirp waveform $V_2(t)$ are illustrated by Equations (26) and (27). The FFT is performed in Step 904 and Step 912 for the deswept up-chirp waveform and the deswept down-chirp waveform, respectively.

$$V_1(f)=V_{11}(f)+N_1(f) \quad (26)$$

$$V_2(f)=V_{22}(f)+N_2(f) \quad (27)$$

wherein $V_1(f)$ is shown in plot 138 of FIG. 7 and $V_2(f)$ is shown in plot 158 of FIG. 7, and wherein $$|V_{11}(f)| = A\frac{\sin[\pi(f_d - f + K(\tau - t_0))(T - |\tau - t_0|)]}{\pi(f_d - f + K(\tau - t_0))}, t_0 - T \leq \tau \leq t_0 + T \quad (28)$$
$$= A(T - |\tau - t_0|)\text{sinc}\{(f_d - f + K(\tau - t_0))(T - |\tau - t_0|)\}$$

$$|V_{22}(f)| = A\frac{\sin[\pi(f_d - f - K(\tau - t_0))(T - |\tau - t_0|)]}{\pi(f_d - f + K(\tau - t_0))}, t_0 - T \leq \tau \leq t_0 + T \quad (29)$$
$$= A(T - |\tau - t_0|)\text{sinc}\{(f_d - f - K(\tau - t_0))(T - |\tau - t_0|)\}$$

Determining an estimated frequency for the frequency representation of the deswept up-chirp waveform $v_1(t)$ and the frequency representation of the deswept down-chirp waveform $v_2(t)$, designated respectively as $f_m$ and $\tilde{f}_m$, is done by finding a frequency corresponding to a largest amplitude of the fast Fourier transform in an up-chirp and down-chirp path. The deswept up-chirp frequency $f_m$ (also referred to as $f_{up}$ in Equation (5)) is given by Equation (30) and the deswept down-chirp frequency $\tilde{f}_m$ (also referred to as $f_{dn}$ in Equation (6)), is given by Equation (31), theoretically.

In practice, the frequency estimates $f_m$ and $\tilde{f}_m$ also called peak frequency estimates, are subject to noise disturbance. Nevertheless, they are unbiased estimates of true frequencies of the up-chirp waveform and the down-chirp waveform contained in the received waveform, r(t).

Advantageously, knowing the two frequency estimates $\hat{f}_m$ and $\hat{\bar{f}}_m$ (also referred to as $\hat{f}_{up}$ and $\hat{f}_{dn}$), and the relationships expressed by Equations (30) and (31), an estimate of Doppler frequency shift (or error frequency) $\hat{f}_d$ and a time delay estimate $\hat{t}_0$ may be obtained (Equations (32) and (33)) as follows:

$$f_m = f_d + K(\tau - t_0) \quad (30)$$

$$\bar{f}_m = f_d - K(\tau - t_0) \quad (31)$$

$$f_d + 0.5(\hat{f}_m \bar{f}_m) \quad (32)$$

$$\hat{t}_0 = \tau - \frac{(\hat{f}_m - \hat{\bar{f}}_m)}{2K} \quad (33)$$

where τ is the start time of the hypothesized composite waveform or the time from t=0 that the set of buffer samples that contains the largest portion of the dual-chirp waveform. Time τ is further described in FIG. 8. Note that in Equations (5) through (8), τ=0.

Again, as stated earlier, the relationships illustrated in Equations (30) and (31) provide, mathematically, two different equations having two unknowns, which are solved for. The dual-chirp waveform, as described above is an example of a composite waveform that is expressed in terms of Equations (30) and (31). Alternatively, other types of composite waveforms may be used; however, depending on the specific characteristics of the component waveforms of the composite waveform, modeling such component waveforms into relationships between the frequency and timing offsets, as shown in Equations (30) and (31), may be more difficult, for example, if the component waveforms do not have frequencies that vary linearly with time. Thus, the mathematical analysis will have to be adjusted.

As for the case of a composite waveform as shown in FIGS. 6A through 6D, the two equations, e.g. Equations (30) and (31), for this composite waveform would essentially provide the same relationship for each of the component waveforms. The result would be two equations each having two unknowns (i.e. $f_d$ and $t_0$); however, both equations would essentially be the same, yielding inconclusive estimates of the frequency and timing offsets. In contrast, as shown above, a composite waveform meeting the three design characteristics described above, such as the dual-chirp waveform, will yield accurate measurements of the frequency and timing offsets needed for synchronization while avoiding the problems of the prior art acquisition schemes, e.g. mitigates unmodulated spurs, can be used with an FFT, no modifications to the receiver hardware, efficient use of processing bandwidth, and supports acquisition of voice and tracking of alerting services in the same composite waveform.

Figure 10:
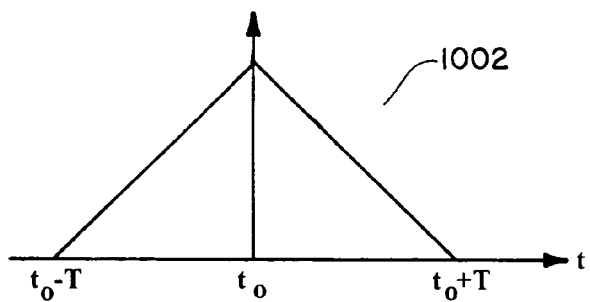
FIG. 10 illustrates a plot of the amplitude of the Fourier Transform Peak over the course of the duration of the composite signal waveform, which is illustrated as the dual-chirp waveform.

Finally, referring next to FIG. 10, a plot 1002 of the amplitude of a Fourier Transform Peak versus time (i.e. searching time) is shown. An estimate of the Burst's time of arrival can be obtained by determining the peak of a triangle shown in FIG. 10. Thus, at the peak of the plot, the composite signal waveform, e.g. the dual-chirp waveform, has completely arrived (the largest portion of the dual-chirp waveform is present in the input buffer) at the acquisition section of the mobile terminal.

While the invention herein disclosed has been described by means of specific embodiments and applications thereof, numerous modifications and variations could be made thereto by those skilled in the art without departing from the scope of the invention set forth in the claims.

What is claimed is:

1. A method for enabling synchronization of a communications terminal in a wireless communication system comprising:
    receiving a burst at a receiver of the communications terminal, the burst containing a composite waveform including two or more component waveforms, wherein each of the two or more waveforms has a known frequency variation throughout the burst;
    estimating a frequency offset and a timing offset of said composite waveform as received into said receiver whereby said synchronization of said communications terminal is achieved;
    detecting a first component waveform of said two or more component waveforms, and detecting a second component waveform of said two or more waveforms, wherein said detecting said first component waveform comprises desweeping said first component waveform into a first deswept component waveform, wherein said first deswept component waveform is a narrow band waveform;
    transforming said first deswept component waveform into a first frequency domain representation;
    estimating a signal-to-noise ratio of said first frequency domain representation;
    comparing said signal-to-noise ratio of said first frequency domain representation to a threshold;
    estimating, in the event said threshold is exceeded, a first peak frequency of said first frequency domain representation;
    desweeping said second component waveform of said two or more component waveforms into a second deswept component waveform;
    transforming said second deswept component waveform into a second frequency domain representation; and
    estimating a second peak frequency from said second frequency domain representation; and
    wherein said estimating comprises estimating, using said first peak frequency and said second peak frequency and said known frequency variation of each of said first component waveform and said second component waveform; and
    wherein said frequency offset is defined by the formula:

$$f_d = 0.5(f_1 + f_2)$$

wherein $f_d$ is said frequency offset in Hertz, $f_1$ is said first peak frequency in Hertz, and $f_2$ is said second peak frequency in Hertz.

2. A method for enabling synchronization of a communications terminal in a wireless communication system comprising:
    receiving a burst at a receiver of the communications terminal, the burst containing a composite waveform including two or more component waveforms, wherein each of the two or more waveforms has a known frequency variation throughout the burst;
    estimating a frequency offset and a timing offset of said composite waveform as received into said receiver whereby said synchronization of said communications terminal is achieved;
    detecting a first component waveform of said two or more component waveforms, and detecting a second component waveform of said two or more waveforms, wherein said detecting said first component waveform comprises desweeping said first component waveform into a first deswept component waveform, wherein said first deswept component waveform is a narrow band waveform;

transforming said first deswept component waveform into a first frequency domain representation;

estimating a signal-to-noise ratio of said first frequency domain representation;

comparing said signal-to-noise ratio of said first frequency domain representation to a threshold;

estimating, in the event said threshold is exceeded a first peak frequency of said first frequency domain representation;

desweeping said second component waveform of said two or more component waveforms into a second deswept component waveform;

transforming said second deswept component waveform into a second frequency domain representation; and estimating a second peak frequency from said second frequency domain representation; and wherein said estimating comprises estimating, using said first peak frequency and said second peak frequency and said known frequency variation of each of said first component waveform and said second component waveform; and the method of claim 1 wherein said timing offset is defined by the formula:

$$t_0 = \tau - [(f_1 - f_2)/2K]$$

wherein $f_1$ is said first peak frequency in Hertz, $f_2$ is said second peak frequency in Hertz, K is the absolute value of said known frequency variation of said each of said first component waveform and said second component waveform in Hertz/second, and $\tau$ is a time in seconds at which said composite waveform is hypothesized to arrive at said communications terminal.

3. An acquisition system of a wireless communications terminal for acquiring a received composite waveform including two or more component waveforms and estimating a frequency offset and a timing offset of the received composite waveform comprising:

a first phase shifter for desweeping a first component waveform of the received composite waveform; and a first processor coupled to the first phase shifter for transforming the first component waveform having been deswept into a first frequency domain representation.

4. The system of claim 3 wherein said first processor is a first fast Fourier transform processor.

5. The system of claim 3 further comprising a detection processor coupled to said first processor for detecting a peak of said first frequency domain representation, whereby detecting the presence of said first component waveform.

6. The system of claim 5 wherein said detection processor estimates a first peak frequency of said first frequency domain representation.

7. The system of claim 6 wherein said detection processor includes a discrete Fourier transform for fine-tuning the estimation of said first peak frequency.

8. The system of claim 5 further comprising:

a second phase shifter for desweeping a second component waveform of said received composite waveform; and a second processor coupled to the second phase shifter for transforming the second component waveform, having been deswept, into a second frequency domain representation.

9. The system of claim 8 wherein said second processor is a second fast Fourier transform processor.

10. The system of claim 8 further comprising a detection processor coupled to said second processor for detecting a peak of said second frequency domain representation.

11. The system of claim 10 wherein said detection processor estimates a second peak frequency of said second frequency domain waveform.

12. The system of claim 11 wherein said detection processor includes a discrete Fourier transform for fine-tuning the estimation of said second peak frequency.

13. The system of claim 11 wherein said detection processor includes a parameter estimator for computing said frequency offset and said timing offset of said received composite waveform.

14. The system of claim 3 wherein said received composite waveform comprises a received dual-chirp waveform.

15. The system of claim 3 further comprising:

a matched filter for filtering the received composite waveform; and a buffer coupled to the matched filter, wherein the buffer is further coupled to said first phase shifter.

* * * * *